US009848340B2

(12) United States Patent
Kazmi et al.

(10) Patent No.: US 9,848,340 B2
(45) Date of Patent: Dec. 19, 2017

(54) TECHNIQUE FOR PERFORMING CELL MEASUREMENT ON AT LEAST TWO CELLS

(71) Applicant: Telefonaktiebolaget L M Ericsson (publ), Stockholm (SE)

(72) Inventors: Muhammad Kazmi, Bromma (SE); Joakim Axmon, Kavlinge (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 0 days.

(21) Appl. No.: 13/886,676

(22) Filed: May 3, 2013

(65) Prior Publication Data
US 2013/0308481 A1    Nov. 21, 2013

Related U.S. Application Data

(60) Provisional application No. 61/648,948, filed on May 18, 2012.

(51) Int. Cl.
*H04W 24/02* (2009.01)
*H04W 48/16* (2009.01)

(52) U.S. Cl.
CPC .......... *H04W 24/02* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 2004/0136340 A1* | 7/2004 | Sanchez et al. | 370/329 |
| 2007/0237261 A1* | 10/2007 | Lindoff et al. | 375/316 |
| 2007/0298780 A1* | 12/2007 | Lindoff | H04J 11/0093 455/423 |
| 2009/0042601 A1* | 2/2009 | Wang et al. | 455/553.1 |
| 2009/0296660 A1* | 12/2009 | Weng | 370/332 |
| 2010/0041384 A1* | 2/2010 | Kazmi | 455/419 |
| 2010/0267394 A1* | 10/2010 | Wu | 455/450 |
| 2011/0105112 A1* | 5/2011 | Cave et al. | 455/424 |
| 2011/0188396 A1* | 8/2011 | Jung et al. | 370/252 |
| 2011/0263261 A1* | 10/2011 | Vachhani et al. | 455/437 |
| 2012/0087257 A1* | 4/2012 | Larsson et al. | 370/252 |

(Continued)

FOREIGN PATENT DOCUMENTS

WO    WO 2011139091 A2 * 11/2011

OTHER PUBLICATIONS

3GPP TS 25.104, V10.5.0 "Base Station (BS) radio transmission and reception (FDD)" (Release 10), Mar. 2012, all pages.

(Continued)

*Primary Examiner* — Peter Chau
(74) *Attorney, Agent, or Firm* — Leffler Intellectual Property Law, PLLC

(57) ABSTRACT

A technique for performing at least one measurement on at least a first cell and a second cell is disclosed. The first cell employs i) a first Radio Access Technology (RAT), different from a second RAT of the second cell, and ii) a first carrier substantially the same as a second carrier of the second cell. In a method aspect, the method is performed in a by a User Equipment (UE), and comprises the step of configuring the UE to perform the at least one measurement on the first and second cells substantially simultaneously with UE operations different from the at least one measurement.

25 Claims, 10 Drawing Sheets

(56) References Cited

U.S. PATENT DOCUMENTS

2012/0295606 A1* 11/2012 Sebire et al. .............. 455/422.1
2013/0051274 A1*  2/2013 Jeong et al. ................. 370/252
2013/0072189 A1*  3/2013 Cheng et al. ................ 455/436
2013/0084856 A1*  4/2013 Prasad et al. ................ 455/434
2013/0258876 A1* 10/2013 Damji et al. ................. 370/252

OTHER PUBLICATIONS

3GPP TS 36.104, V10.6.0 "Base Station (BS) radio transmission and reception" (Release 10), Mar. 2012, all pages.

* cited by examiner

FIG. 3
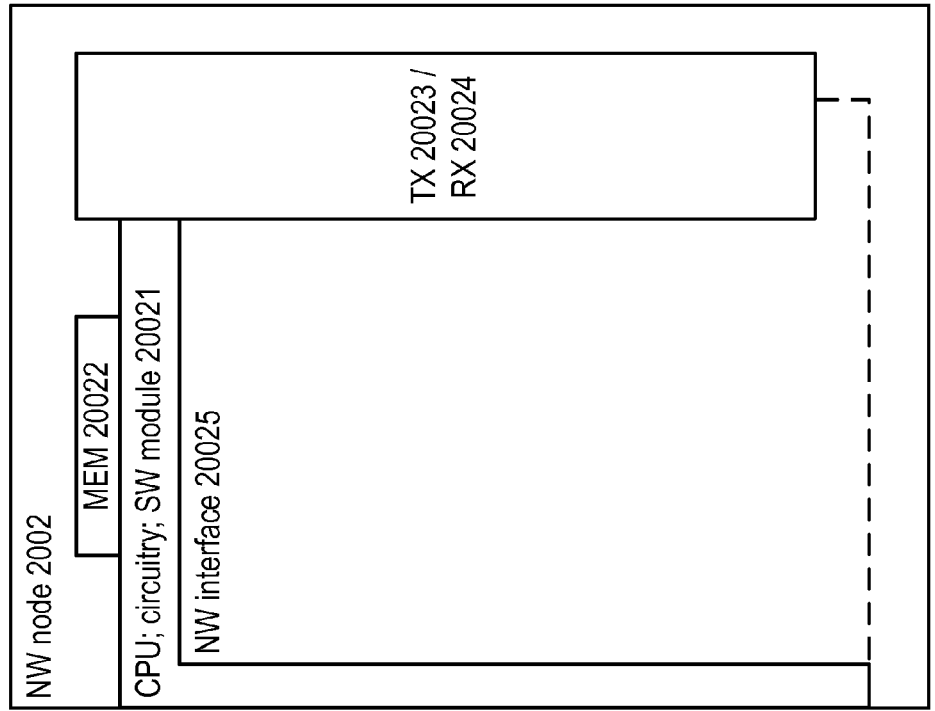
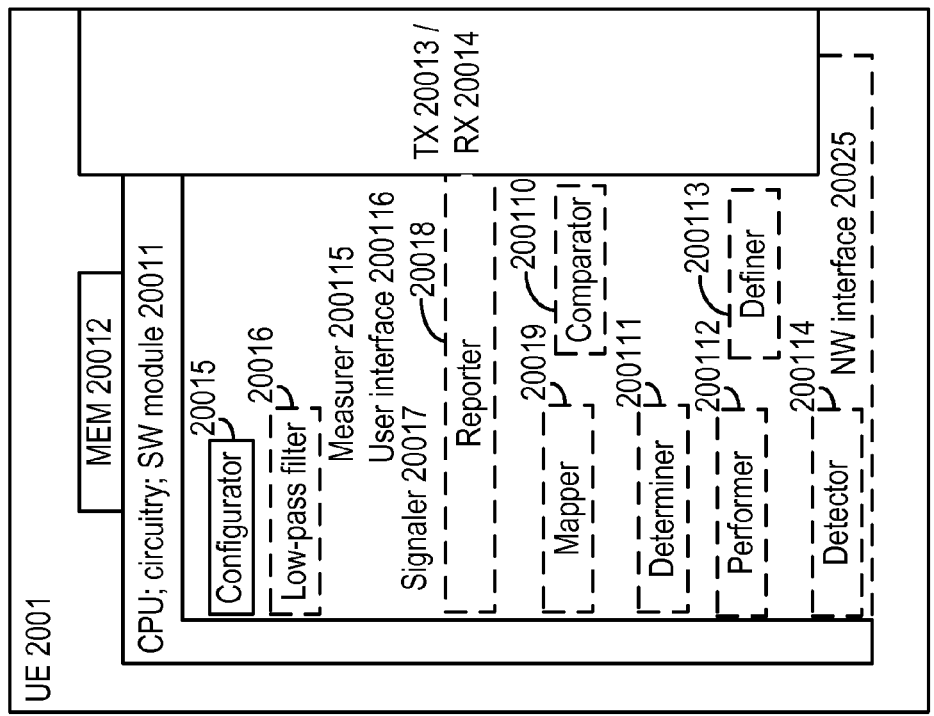

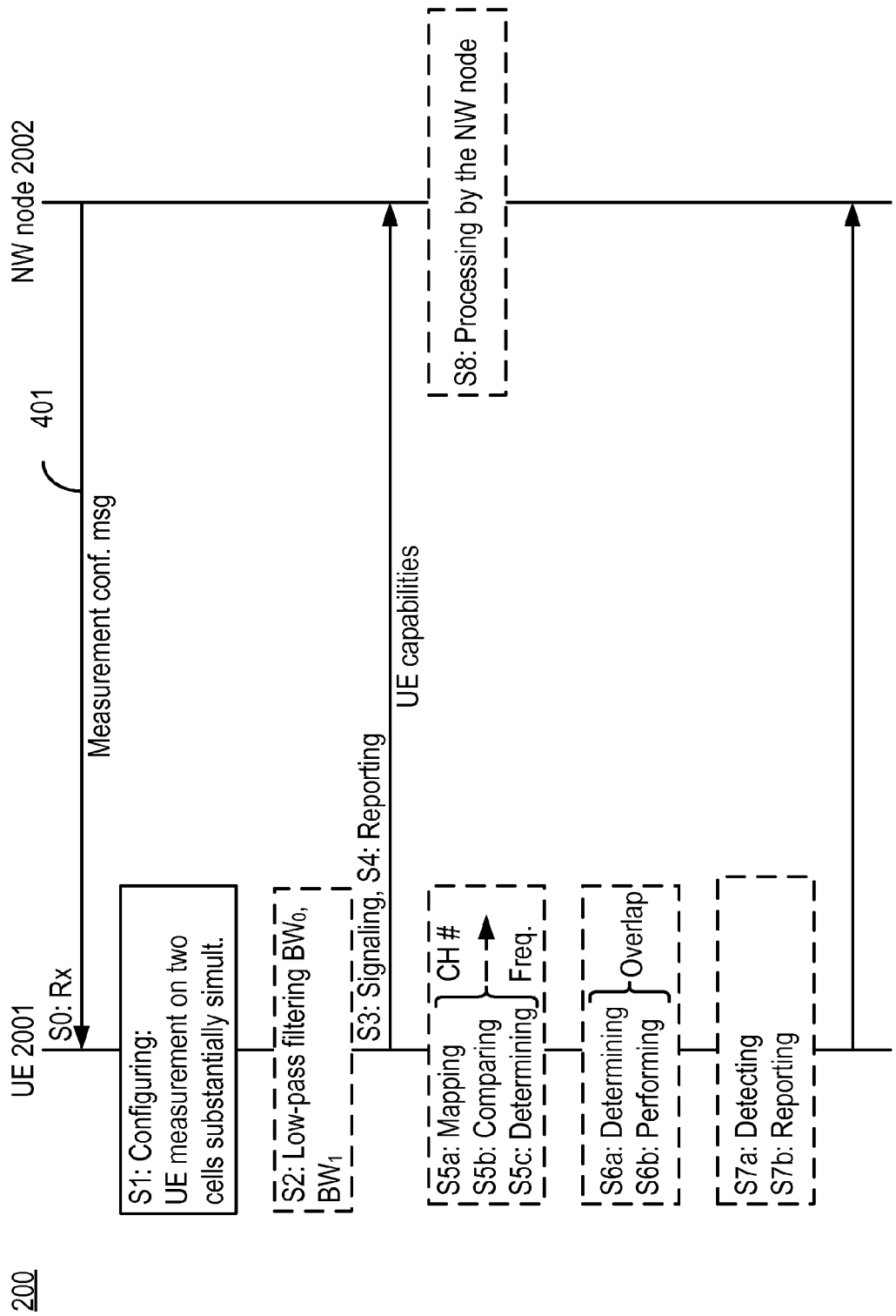

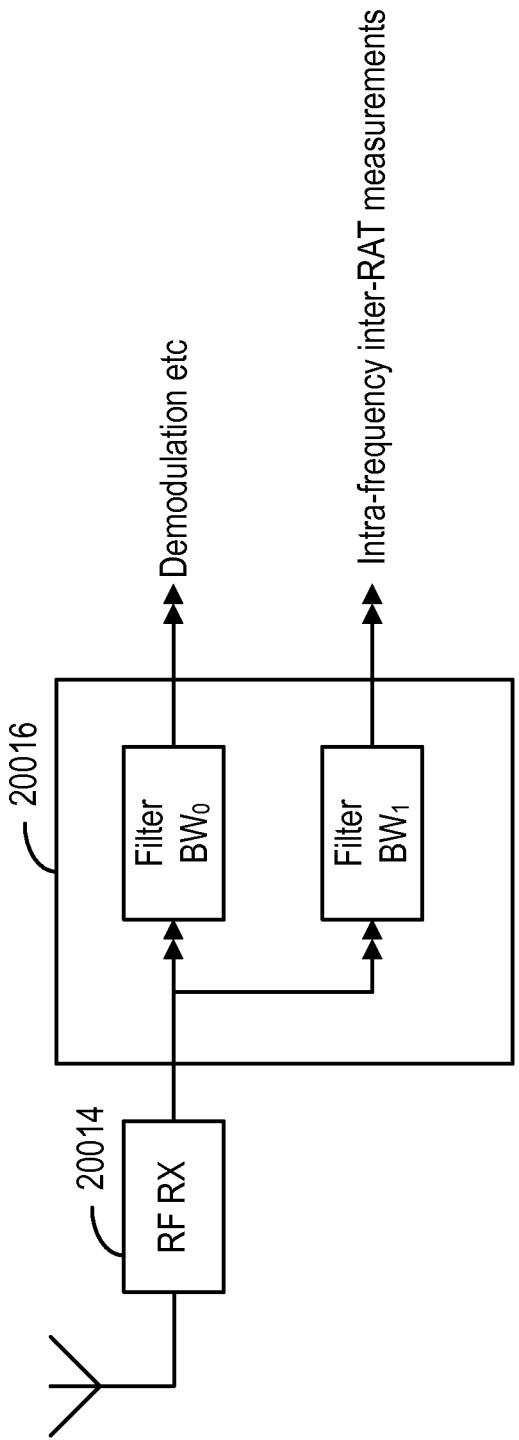

TECHNIQUE FOR PERFORMING CELL MEASUREMENT ON AT LEAST TWO CELLS

CROSS REFERENCE TO RELATED APPLICATIONS

This application claims the benefit of U.S. Provisional Application No. 61/648,948, filed May 18, 2012, which is hereby incorporated herein by reference in its entirety.

TECHNICAL FIELD

The present disclosure generally relates to performing a cell measurement on at least two cells. Specifically, the present disclosure relates to cell measurements on at least two cells employing different radio RATs and substantially the same carriers.

BACKGROUND

Channel Rastering

In order to simplify the frequency search or the so-called initial cell search the center frequency of a radio channel is specified to be an integral multiple of a well-defined, generally fixed number, called channel raster. This enables a User Equipment (UE) to tune its local oscillator only at one of the raster points assuming it to be the center frequency of the channel being searched.

For example, the channel raster in UTRAN Frequency Division Duplex (FDD) is 200 kHz, but for certain channels and bands the raster is also 100 kHz. In E-UTRAN FDD and TDD, channel raster for all channels (i.e. all bandwidths) is 100 kHz. The channel raster directly impacts the channel numbering, which is described herein below.

Channel Numbering of Frequency Bands

The carrier frequencies in a frequency band are enumerated. The enumeration is standardized such that the combination of the frequency band and the carrier frequency can be determined by a unique number called absolute radio frequency number.

In GSM, UTRAN and E-UTRAN the channel numbers are called Absolute Radio Frequency Channel Number (ARFCN), UTRA Absolute Radio Frequency Channel Number (UARFCN) and E-UTRA Absolute Radio Frequency Channel Number (EARFCN), respectively.

In FDD systems, separate channel numbers are specified for UpLink (UL) and DownLink (DL). In Time Division Duplex (TDD), there is only one channel number since the same frequency is used in both directions.

The channel numbers (e.g. EARFCN) for each band are unique to distinguish between different bands. The channel number for each band can be derived from the expressions and mapping tables defined for different RATs. Based on the signaled channel numbers (e.g. EARFCN in E-UTRAN) and the pre-defined parameters associated with each band, the UE can determine the actual carrier frequency in MHz and the corresponding frequency band. This is explained by the following example.

For example, the relation between the EARFCN and the carrier frequency ($F_{DL}$) in MHz for the downlink is pre-defined by the following equation:

$$F_{DL}=F_{DL\_low}+0.1(N_{DL}-N_{Offs-DL})$$

where $F_{DL\_low}$ and $N_{Offs-DL}$ are pre-defined values for each band and $N_{DL}$ is the downlink EARFCN.

Consider, for example, E-UTRA band 5, whose EARFNC range ($N_{DL}$) lies between 2400-2649. The pre-defined values of $F_{DL\_low}$ and $N_{Offs-DL}$ are 869 and 2400, respectively. Assume the network signals downlink EARFCN to be 2500. Using the above expression, the UE can determine that the downlink carrier frequency of the channel is 879 MHz. Furthermore, as stated above that the pre-defined EARFNC range being unique for each band, hence the UE can determine the frequency band corresponding to the signaled EARFNC. An expression to derive the E-UTRA FDD uplink carrier frequency, which is similar to that of the downlink carrier frequency, is also pre-defined. In E-UTRA FDD, both fixed transmit-receive frequency separation (i.e. fixed duplex) and variable transmit-receive frequency separation (i.e. variable duplex) are supported. If fixed transmit-receive frequency separation is used by the network then the network does not have to signal the uplink EARFCN since the UE can determine the UL carrier frequency from the downlink carrier frequency and the pre-defined duplex gap. In the event that the variable duplex is employed by the network for a certain band, then both DL and UL EARFCN have to be signaled.

Channel Number Indication Mechanism for Radio Management Tasks

The network signals the channel number of a carrier along with other information to the UE for one or more radio management tasks e.g. to request UE to do measurements, for performing cell change etc. This is explained below:

For the initial cell search or more specifically for the initial carrier frequency search, the UE has to search at all possible raster frequencies e.g. with 100 kHz resolution in E-UTRAN frequency band. However, for the UEs camped on or connected to the cell, the network signals the absolute radio frequency channel number(s) for performing measurements, mobility decisions such as cell reselection or commanding handover to certain cell belonging to certain frequency channel of the same or of different RAT etc.

Hence the UE, after camping on a cell in idle mode or when connected to a cell in connected mode, can acquire the cell specific or UE specific system information, which contains information such as frequency band number (frequency band indicator), absolute radio frequency channel number(s) etc. More specifically, in LTE the band number and the ARFCN (e.g. UL EARFNC in LTE) is signaled to the UE over the relevant System Information Blocks (SIB). For example in LTE the band number and the EARFCN of the cell are signaled to the UE over SIB1 and SIB2, respectively. This information is used by the UE for performing measurements, e.g. mobility measurements, positioning measurements, Minimization of Drive Tests (MDT) measurements etc.

The network can request the UE to perform cell change (e.g. handover) to another frequency or another RAT in the frequency band, which can either be the same or different than the carrier frequency of the serving cell. Therefore, in order to assist the UE to perform the inter-frequency or inter-RAT handover, the network signals the frequency channel number of the target carrier frequency in the cell change or mobility command (e.g. handover command) to the UE.

Frequency Error in Base Station (BS) Transmitter

The carrier frequency on which the base station transmits signals on a cell may incorporate frequency error due to RF impairments.

Frequency error is the measure of the difference between the actual base station transmitted frequency and the assigned frequency. The same source is generally used for RF frequency and data clock generation.

Frequency Error in LTE BS

The modulated carrier frequency of each E-UTRA carrier configured by the BS is within the accuracy range given in Table 1 observed over a period of one subframe in LTE (1 ms). The same requirements apply to Multi-Standard Radio (MSR) base station supporting LTE.

TABLE 1

Frequency error minimum requirement in LTE (FDD and TDD)

| BS class | Accuracy |
|---|---|
| Wide Area BS | ±0.05 ppm |
| Local Area BS | ±0.1 ppm |
| Home BS | ±0.25 ppm |

Frequency Error in WCDMA BS

The modulated carrier frequency of the BS shall be accurate to within the accuracy range given in Table 2 observed over a period of one timeslot in WCDMA. The same requirements apply to Multi-Standard Radio (MSR) base station supporting WCDMA.

TABLE 2

Frequency error minimum requirement in WCDMA

| BS class | Accuracy |
|---|---|
| Wide Area BS | ±0.05 ppm |
| Medium Range BS | ±0.1 ppm |
| Local Area BS | ±0.1 ppm |
| Home BS | ±0.25 ppm |

SUMMARY

In connected mode, inter-frequency and inter-RAT mobility measurements are in general carried out in measurement gaps in which the communication with the serving cell (primary cell) is interrupted. In LTE, the measurement gaps are 6 ms long every 40 or 80 ms, meaning that in worst case one may lose some 15% of throughput due to the gaps (6 ms interruption every 40 ms). Intra-frequency measurements, however, do not depend on gaps and can be carried out by the UE while communicating with the base station.

Some UE implementations may have multiple receivers by which they under some circumstances can carry out inter-frequency or inter-RAT measurements without measurement gaps. The standard provides means for signaling of UE EUTRA capabilities between the UE and the network whether the UE needs measurement gaps for inter-frequency and inter-RAT measurements (interFreqNeedForGaps and interRAT-NeedForGaps for each supported band).

Recent network deployment scenarios discussed by leading operators include scenarios where cells of different RATs overlap each other partially or fully in frequency, where problems related to physical overlap of Dual Carrier HSPA (DC-HSPA) or 2 single carrier WCDMA cells and a 10 MHz LTE cell are addressed. Potential heterogeneous (in the sense: diversity of RATs overlapping each other partially or fully in frequency) deployment scenarios are however not restricted to the aforementioned combination of DC WCDMA and 10 MHz LTE cells.

Rather, one can imagine network deployment scenarios where for instance 5 MHz LTE cells coexists with WCDMA cells (which also have 5 MHz nominal channel spacing), and share the same center frequency. Such deployment scenarios can be temporary while e.g. gradually replacing WCDMA cells by LTE cells, or permanent where for instance only hot-spots are upgraded to LTE cells and remaining coverage is provided by existing WCDMA cells.

The recent network deployment scenarios imply that inter-RAT neighbor cells also might be intra-frequency neighbors. The standard does not provide any means for the UE to measure on such inter-RAT neighbors without requesting measurement gaps.

Accordingly, there is a need for an implementation of a scheme that avoids one or more of the problems discussed above, or other problems.

In a first aspect, there is provided a method of performing at least one measurement on at least a first cell and a second cell, the first cell employing i) a first Radio Access Technology (RAT), different from a second RAT of the second cell, and ii) a first carrier substantially the same as a second carrier of the second cell, the method being performed in/by a User Equipment (UE) and comprising the step of configuring the UE to perform the at least one measurement on the first and second cells substantially simultaneously with UE operations different from the at least one measurement.

According to the first aspect, the following refinements have been contemplated:

the first carrier being substantially the same as the second carrier involves the first and second carriers having substantially the same center frequency and the same or a different bandwidth;

substantially the same center frequency involves a tolerance between the two center frequencies in the range of parts per billion, ppb;

the first RAT is selected from a group consisting of Wideband Code Division Multiple Access (WCDMA), Long Term Evolution (LTE), Time Division Synchronous Code Division Multiple Access (TD-SCDMA), High Speed Packet Access (HSPA), UMTS Terrestrial Radio Access Network (UTRAN), Evolution UTRAN (E-UTRAN), Enhanced Data Rates for GSM Evolution (EDGE), GSM EDGE Radio Access Network (GERAN), Code Division Multiple Access 2000 (CDMA2000), High Rate Packet Data (HRPD) and Worldwide Interoperability for Microwave Access (Wi-MAX), and the second RAT is selected from the same group not comprising the first RAT;

the first and second carriers coincide, at least in a center frequency, with a serving carrier of the UE;

the method further comprises low-pass filtering a received data stream over a first bandwidth and a second bandwidth so as to differentiate the serving carrier from the first and second carriers to be measured, if the bandwidth of the first carrier is different from the bandwidth of the second carrier;

the method further comprises low-pass filtering a received data stream over a first bandwidth and a second bandwidth so as to perform signal-shaping on the serving carrier as wells as the first and second carriers to be measured, if the bandwidth of the first carrier is substantially the same as the bandwidth of the second carrier;

the method further comprises signaling, from the UE to a network node, the UE's capability for performing measurements on the first and second cells being intra-frequency inter-RAT neighboring cells;
the signaling comprises reporting the UE's capability;
a plurality of cells and a corresponding plurality of RATs are involved, and the report comprises at least one of:
an ability to perform intra-frequency inter-RAT measurements on all supported RATs,
an ability to perform intra-frequency inter-RAT measurements on a specific combination of RATs,
an ability to perform intra-frequency inter-RAT measurements on all RATs or a subset of RATs having the same carrier as the serving carrier,
an ability to perform intra-frequency inter-RAT measurements on all RATs or a subset of RATs having substantially the same center frequency,
an ability to perform intra-frequency inter-RAT measurements per frequency band, and
an ability to perform intra-frequency inter-RAT measurements depending on the bandwidth of the serving carrier;
the report further comprises at least one of:
types of intra-frequency inter-RAT measurements,
if the UE is multi-carrier capable, a number or the entirety of carriers that support intra-frequency inter-RAT measurements,
an ability to perform intra-frequency inter-RAT measurements on carriers having a certain tolerance with respect to the serving carrier, and
an ability to acquire system information of a cell using autonomous gaps;
the method further comprises receiving a measurement configuration message from a network node, the message including one or more new inter-RAT carriers on which the UE is requested to perform a measurement;
the message comprises at least one of:
information related to the relative frequency error or frequency error between a set of the one or more intra-frequency inter-RAT carriers,
an indication or information regarding the set of RATs whose carriers are aligned, and
an indication to perform the measurement in at least one of a low activity state and in connected state of the UE;
the method further comprises mapping both a first channel number contained in the measurement configuration message and a second channel number for the serving carrier to a physical frequency, comparing the first and second channel number, and determining, based on the comparing, a degree of similarity between the first and second channel numbers;
the first and second carriers are different, at least in a center frequency, from a serving carrier of the UE;
the method further comprises signaling, from the UE to a network node, the UE's capability for performing measurements on the first and second cells being inter-frequency inter-RAT neighboring cells;
a plurality of cells and a corresponding plurality of RATs are involved, and a report is involved in the signaling, which report comprises at least one of:
a number of carriers which the UE can support for monitoring those carriers in parallel, and
if UE has indicated that it is capable of performing intra-frequency inter-RAT measurements, an ability to perform inter-frequency inter-RAT measurements;
the signaling of the report is performed proactively.

the signaling is performed during at least one of:
an initial setup,
a cell setup, and
a cell change;
the signaling of the report is performed responsive to receiving a request;
the method further comprises determining whether an inter-frequency carrier overlaps a new inter-RAT carrier, and if the determining is affirmative, performing the measurement simultaneously;
the method further comprises defining a first set of basic rules that the UE has to fulfill unconditionally, and defining a second set of more sophisticated rules the UE has to fulfill if the step of configuring is performed;
the method further comprises autonomously detecting one or more cells of different RATs having an overlapping frequency range;
the method further comprises reporting, from the UE to a network node, the result of detection.

In a second aspect, there is provided a computer program comprising program code portions to perform, when the computer program is executed on one or more computing devices, a method comprising the step of configuring a User Equipment (UE), to perform at least one measurement on a first cell and a second cell substantially simultaneously with UE operations different from the at least one measurement, wherein the first cell employs i) a first Radio Access Technology (RAT), different from a second RAT of the second cell, and ii) a first carrier substantially the same as a second carrier of the second cell.

According to the second aspect, the computer program may be stored on a computer readable recording medium.

In a third aspect, there is provided a User Equipment (UE), for performing at least one measurement on at least a first cell and a second cell, the first cell employing i) a first Radio Access Technology (RAT), different from a second RAT of the second cell, and ii) a first carrier substantially the same as a second carrier of the second cell, the UE comprising a configurator configured to configure the UE to perform the at least one measurement on the first and second cells substantially simultaneously with UE operations different from the at least one measurement.

In a fourth aspect, there is provided a User Equipment (UE), for performing at least one measurement on at least a first cell and a second cell, the first cell employing i) a first Radio Access Technology (RAT), different from a second RAT of the second cell, and ii) a first carrier substantially the same as a second carrier of the second cell, the UE comprising means for configuring the UE to perform the at least one measurement on the first and second cells substantially simultaneously with UE operations different from the at least one measurement.

It is to be noted that a network entity (or several entities) may implement any of the technical details set forth for the method aspects herein, and thus achieve the same advantages. In other words, the network entity (or entities) may comprise components adapted to perform any of the method steps disclosed herein. There is also provided a network system comprising one or more of such entities.

BRIEF DESCRIPTION OF THE DRAWINGS

Embodiments of the technique presented herein are described herein below with reference to the accompanying drawings, in which:

FIG. 3 shows the components comprised in the exemplary device embodiment realized in the form of a UE;

FIG. 4 shows a method embodiment which also reflects the interaction between the components of the device embodiment;

FIG. 5 shows a receiver with two data paths where different bandwidths (and potentially also sampling rates) can be used;

DETAILED DESCRIPTION

Figure 1:
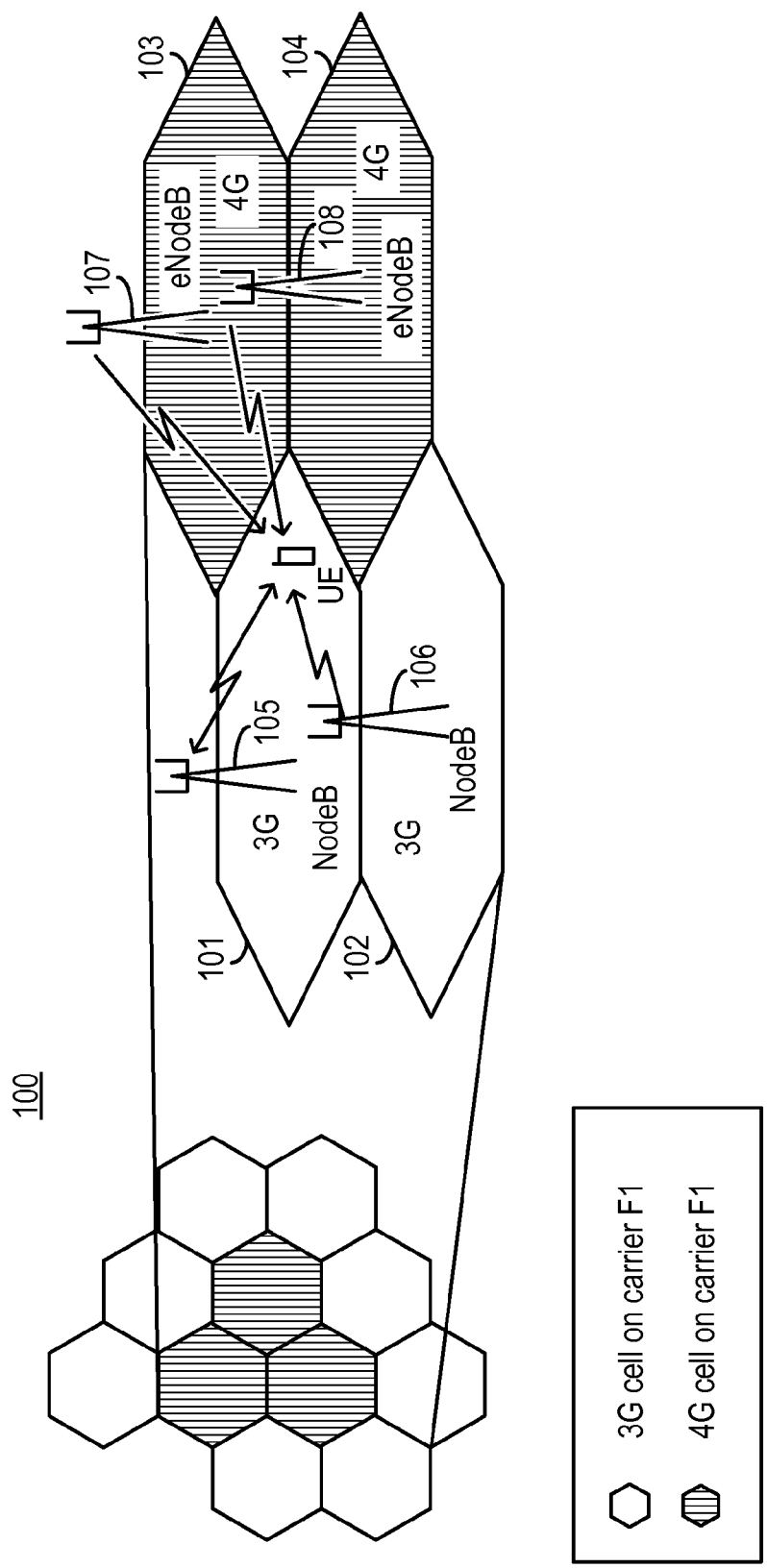
FIG. 1 shows a diagram of a deployment scenario where cells of different RATs coexist on the same carrier frequency.

This description first introduces foundations of embodiments consistent with the invention, and then describes particular aspects of inventive embodiments in greater detail.

In the following description, for purposes of explanation and not limitation, specific details are set forth (such as particular signaling steps) in order to provide a thorough understanding of the technique presented herein. It will be apparent to one skilled in the art that the present technique may be practiced in other embodiments that depart from these specific details. For example, the embodiments will primarily be described in the context of an LTE and/or WCDMA-type communication system; however, this does not rule out the use of the present technique in any other 3GPP or non-3GPP communication systems.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP) or general purpose computer. It will also be appreciated that while the following embodiments are described in the context of methods and devices, the techniques presented herein may also be embodied in a computer program product that, for example, can be stored on any nontransitory processor-readable storage medium such as, without limitation, electronic, magnetic, and optical storage media. The techniques presented herein may also be embodied in a system comprising a computer processor and a memory coupled to the processor, wherein the memory is encoded with one or more programs that execute the services, functions and steps disclosed herein.

Measurements

Measurements are performed by the UE on the serving as well as on neighbor cells over some known reference symbols or pilot sequences. The measurements are done on cells on an intra-frequency carrier, inter-frequency carrier(s) as well as on inter-RAT carriers(s) (depending upon the UE capability whether it supports that RAT).

The UE receives measurement configuration or an assistance data/information, which is a message or an Information Element (IE) sent by the network node (e.g. serving eNode B, positioning node etc.) to configure UE to perform the requested measurements. For example, it may contain information related to the carrier frequency, RATs, type of measurement (e.g. RSRP), higher layer time domain filtering, measurement bandwidth related parameters etc.

Some measurements may also require the UE to measure the signals transmitted by the UE in the uplink. The measurements are done by the UE in RRC connected state as well as in low activity RRC states (e.g. idle state, CELL_FACH state in HSPA, URA_PCH and CELL_PCH states in HSPA etc.).

In multi-carrier or Carrier Aggregation (CA) scenario, the UE may perform the measurements on the cells on the Primary Component Carrier (PCC) as well as on the cells on one or more Secondary Component Carriers (SCCs).

The measurements are done for various purposes. Some example measurement purposes are: mobility, positioning, Self-Organizing Network (SON), Minimization of Drive Tests (MDT), Operation and Maintenance (O&M), network planning and optimization etc.

The measurements may be performed over longer time duration on the order of a few 100 ms to a few seconds. The same measurements are applicable in single carrier and CA. However, in carrier aggregation the measurement requirements may be different. For example the measurement period may be different in CA i.e. it can be either relaxed or more stringent depending upon whether the SCC is activated or not. This may also depend upon the UE capability i.e. whether a CA capable UE is able to perform measurement on SCC with or without gaps.

Examples of mobility measurements in LTE are:
Reference Symbol Received Power (RSRP)
Reference Symbol Received Quality (RSRQ)
Examples of mobility measurements in HSPA are:
Common PIlot CHannel Received Signal Code Power (CPICH RSCP)
CPICH Ec/No
An example of mobility measurements in GSM/GERAN are:
GSM carrier RSSI
Examples of mobility measurements in CDMA2000 systems are:
Pilot strength for CDMA2000 1×RTT
Pilot strength for HRPD
The mobility measurement may also comprise of identifying or detecting a target cell, which may belong to LTE, HSPA, CDMA2000, GSM, etc.
Examples of positioning measurements in LTE are:
Reference Signal Time Difference (RSTD)
UE RX-TX time difference measurement The UE RX-TX time difference measurement requires the UE to perform measurement on the downlink reference signal as well as on the uplink transmitted signals.

Example of other measurements which may be used for MDT, SON or for other purposes are:

One or more intra-frequency, inter-frequency or inter-RAT signal strength and/or signal quality measurements logged by the UE for MDT or SON purposes.
  Examples of signal strength and signal quality measurements are RSRP in LTE/RSCP in HSPA etc and RSRQ in LTE/CPICH Ec/No in HSPA etc respectively.
Control channel failure rate or quality estimate, e.g.:
  Paging channel failure rate e.g. BLER on paging channel being above a threshold.
  Broadcast channel failure rate e.g. BLER on broad channel being above a threshold.
Physical layer problem detection or synchronization related or radio link monitoring related, e.g.:
  Radio link monitoring, which may in turn include:
    Out of synchronization (out of sync) detection e.g. when hypothetical PDCCH BLER is 10% or more.
    In synchronization (in-sync) detection e.g. when hypothetical PDCCH BLER is 2% or less.
  Radio link failure which occurs after at least one or repeated out of sync occurrences.

The present invention applies to all the measurement types indicated above but is not limited to them.

In the connected state, the UE reports the neighbor cell measurements to the serving node. In response to the reported UE measurement, the serving network node takes a decision e.g. it may send mobility command to the UE for the purpose of cell change. Examples of cell change are handover, RRC connection re-establishment, RRC connection release with redirection, PCell change in CA, PCC change in PCC etc. In idle or low activity state example of cell change is cell reselection.

Positioning Overview

Several positioning methods for determining the location of the target device, which can be a UE, mobile relay, wireless device, PDA etc. exist. The methods are:

Satellite based methods; it uses A-GNSS (e.g. A-GPS) measurements for determining UE position.
OTDOA; it uses UE RSTD measurement for determining UE position in LTE.
UTDOA; it uses measurements done at LMU for determining UE position.
Enhanced cell ID; it uses one or more of UE RX-TX time difference, BS RX-TX time difference, LTE P/RSRQ, HSPA CPICH measurements, Angle of Arrival (AoA) etc. for determining UE position.
Hybrid methods; it uses measurements from more than one method for determining UE position.

In LTE, the positioning node (also referred to as E-SMLC or location server) configures the UE, eNodeB or LMU to perform one or more positioning measurements. The positioning measurements are used by the UE or positioning node to determine the UE location. The positioning node communicates with UE and eNodeB in LTE using LPP and LPPa protocols.

Measurement Gaps for Inter-Frequency/Inter-RAT Measurements

A legacy single carrier UE (i.e. non CA-capable) typically has a receiver able to receive data only on one carrier frequency e.g. one receiver comprising of 5 MHz in case of WCDMA or 20 MHz in case of LTE (i.e. one carrier in LTE can be up to 20 MHz). This means such a UE needs measurement gaps to perform inter-frequency and inter-RAT measurements. The measurements may belong to any category. For example they may be neighbor cell measurements like PCI identification in LTE or HSPA, ECGI or CGI identification in LTE FDD/TDD or HSPA FDD/TDD, LTE RSRP or RSRQ measurements in LTE or CPICH RSCP or CPICH Ec/No measurements in WCDMA. Yet other examples are: GSM carrier RSSI measurement, GSM BSIC identification, CDMA2000 measurements e.g. CDMA 2000 1× Pilot Strength, HRPD Pilot Strength etc.

There may also be positioning related measurements e.g. RSTD in LTE. The UE may also be able to perform other types of measurements e.g. measurements for minimization of drive tests such as pilot measurements or BCH failure rate, measurements for Self-Organizing Network (SON) etc.

During gaps the UE performs measurement on the target frequency or target RAT and therefore it cannot receive the data from the serving cell.

There are basically two types of gaps for doing measurements:

Network configurable measurement gaps. e.g., compressed mode gaps in HSPA and measurement gaps in LTE.
UE autonomous gaps e.g., gaps which are autonomously created by the UE when the UE is requested to read system information of a neighbor cell.

Network Configurable Measurement Gaps

WCDMA

In WCDMA, the measurement gaps are termed as "Compressed Mode (CM) patterns". The CM pattern is comprised of periodical gaps of 7 or more slots occurring with certain periodicity. During the gaps the UE switches from the serving WCDMA carrier to the WCDMA inter-frequency or inter-RAT frequency (e.g. to LTE carrier) for performing the measurement on the target inter-frequency or inter-RAT frequency.

In WCDMA, a separate CM pattern is to be activated for performing measurement on each inter-frequency or inter-RAT carrier.

The CM patterns allow the UE to some extent to recover the data lost during the gaps e.g., by lowering the spreading factor and increasing the BS transmitted power to the UE during the recovery frames.

TD-SCDMA

In TD-SCDMA (UTRA TDD LCR), the measurement gaps are called "DCH Measurement Occasion (DMO)" and "Idle Intervals", respectively. The DMO comprises one or more time slots per subframe (5 ms) repeated for one or more radio frame (10 ms), with a repetition period of one to 512 radio frames. During the DMO, the UE can tune its radio to receive inter-frequency or inter-RAT neighbor cells. The Idle Intervals comprise a TTI every 40 or 80 ms where the UE can tune its radio to an LTE carrier.

Several DMO sequences can be activated in parallel, with one or more measurement purposes (measurement types) assigned to each of them.

LTE

In LTE, the inter-frequency and inter-RAT measurements are also performed during periodical gaps, which occur with periodicity of 40 ms (pattern #0) or 80 ms (pattern #1). Each gap during which the UE performs inter-frequency and inter-RAT measurements is comprised of 6 ms. Unlike WCDMA, the loss in data during the gaps cannot be compensated. This is because there is no concept of compressed frames/sub-frames, which exists in WCDMA where the spreading factor can be lowered to recover the loss of data in gaps. This means in LTE the peak data rate will be reduced due to the measurement gaps, where data cannot be transmitted.

UE Autonomous Gaps for SI Acquisition

In HSPA and LTE, the serving cell can request the UE to acquire the system information of the target cell. More specifically the SI is read by the UE to acquire the Cell Global Identifier (CGI), which uniquely identifies a cell, of the target cell.

The UE reads the SI of the target cell (e.g. intra-, inter-frequency or inter-RAT cell) upon receiving an explicit request from the serving network node via RRC signaling e.g. from RNC in HSPA or eNodeB in case of LTE. The acquired SI is then reported to the serving cell. The signaling messages are defined in the relevant HSPA and LTE specifications.

In order to acquire the SI which contains the CGI of the target cell, the UE has to read at least part of the System Information (SI) including Master Information Block (MIB) and the relevant System Information Block (SIB) as described later. The terms SI reading/decoding/acquisition, CGI/ECGI reading/decoding/acquisition, CSG SI reading/decoding/acquisition are interchangeably used but have the same or similar meaning.

The reading of SI for the acquisition of CGI is carried out during measurement gaps which are autonomously created by the UE. The number of gaps and their size thus depends upon UE implementation as well as on other factors such as the radio conditions, type of SI to be read etc. The term autonomous means that the network does not know exactly when the gaps are created. The gaps are created at least in the downlink and in this case the UE cannot receive data. But autonomous gaps may also be created in the uplink especially when acquiring the SI of the target inter-frequency cell or inter-RAT cell. In this case the UE can neither receive nor transmit data. In contrast the normal periodical measurement gaps (also referred to as compressed mode pattern, transmission gaps etc.) are used for performing for instance mobility measurements such as RSRP/RSRQ. They are configured by the network by sending explicit configuration to the UE. Hence in this case the network precisely knows the location in time of each gap.

The autonomous gaps are needed because the UE cannot receive and/or transmit data in parallel with the reading of the SI of a target cell. The reason is that the simultaneous operation increases complexity, memory requirements and power consumption. Furthermore the legacy single carrier UE (i.e. non CA-capable) typically has a single receiver for receiving data only on one carrier frequency e.g. one receiver comprising of 5 MHz in case of WCDMA or 20 MHz in case of LTE (i.e. one carrier in LTE can be up to 20 MHz). This means such a UE needs autonomous gaps for acquiring at least the inter-frequency and inter-RAT SI. The SI reading may also be used for acquiring additional information beyond CGI e.g. CSG or hybrid CSG indicator etc.

In LTE, the UE reads the MIB and SIB1 of the target cell E-UTRAN cell (which can be FDD or TDD) to acquire its CGI (also referred to as ECGI) when the target cell is E-UTRAN intra- or inter-frequency. In LTE, the MIB is transmitted periodically with a periodicity of 40 ms and repetitions made within 40 ms. The first transmission of the MIB is scheduled in subframe #0 of radio frames for which the SFN mod 4=0, and repetitions are scheduled in subframe #0 of all other radio frames. In LTE the MIB contains basic information such as cell bandwidth, SFN etc.

The LTE SIB1, as well as other SIB messages, is transmitted on DL-SCH. The SIB1 is transmitted with a periodicity of 80 ms and repetitions made within 80 ms. The first transmission of SystemInformationBlockType1 is scheduled in subframe #5 of radio frames for which the SFN mod 8=0, and repetitions are scheduled in subframe #5 of all other radio frames for which SFN mod 2=0. The LTE SIB1 may also indicate whether a change has occurred in the SI messages. The UE is notified about coming change in the SI by a paging message, from which it will know that the system information will change at the next modification period boundary. The modification period boundaries are defined by SFN values for which SFN mod m=0, where m is the number of radio frames comprising the modification period. The modification period is configured by system information. The SIB1 contains information such as CGI, CSG identity, frequency band indicator etc.

In HSPA the UE reads the MIB and SIB3 of the target cell UTRAN cell to acquire its CGI (also referred to as Neighbor Cell SI) when the target cell is UTRAN intra- or inter-frequency. The MIB provides the basic information such as SFN and SIB3 contains the CGI of the target cell.

The procedure for inter-RAT SI acquisition during autonomous gaps is also specified for inter-RAT UTRAN, inter-RAT E-UTRAN, inter-RAT GEM/GERAN, inter-RAT CDMA2000 etc. These are explained below:

In case of inter-RAT UTRAN, the UE served by the E-UTRAN cell reads the MIB and SIB3 of the target UTRAN cell during autonomous gaps to acquire UTRAN cell system information e.g. UTRA cell CGI. In case of inter-RAT E-UTRAN, the UE served by the UTRAN cell reads the MIB and SIB1 of the target E-UTRAN cell (which can be FDD or TDD) during autonomous gaps to acquire E-UTRAN cell system information e.g. S-UTRA cell CGI.

In case of inter-RAT CDMA2000, the UE served by the E-UTRAN cell reads the relevant broadcast information the target CDM2000 cell to acquire CDM2000 cell system information e.g. CDMA2000 cell CGI. CDMA2000 is a generic term. The target CDMA2000 cell can thus belong to CDMA2000 1×RTT or HRPD systems.

The target cell whose SI can be acquired can be intra-frequency cell, inter-frequency cell or even inter-RAT cell (e.g. UTRAN, GERAN, CDMA2000 or HRPD). There are at least few well known scenarios for which the serving cell may request the UE to report the CGI of the target cell.

Verification of CSG cell.

Establishment of SON ANR.

MDT.

Carrier Aggregation

To enhance peak-rates within a technology, multi-carrier or carrier aggregation solutions are known. For example, it is possible to use multiple 5 MHz carriers in HSPA to enhance the peak-rate within the HSPA network. Similarly in LTE for example multiple 20 MHz carriers or even smaller carriers (e.g. 5 MHz) can be aggregated in the UL and/or on DL. Each carrier in multi-carrier or carrier aggregation system is generally termed as a Component Carrier (CC) or sometimes is also referred to as a cell. In simple words the Component Carrier (CC) means an individual carrier in a multi-carrier system. The term Carrier Aggregation (CA) is also called (e.g. interchangeably called) "multi-carrier system", "multi-cell operation", "multi-carrier operation", "multi-carrier" transmission and/or reception. This means the CA is used for transmission of signaling and data in the uplink and downlink directions. One of the CCs is the Primary Component Carrier (PCC) or simply primary carrier or even anchor carrier. The remaining ones are called Secondary Component Carrier (SCC) or simply secondary carriers or even supplementary carriers. Generally the primary or anchor CC carries the essential UE specific signaling. The primary CC exists in both uplink and direction CA. The network may assign different primary carriers to different UEs operating in the same sector or cell.

Therefore the UE has more than one serving cell in downlink and/or in the uplink: one primary serving cell and one or more secondary serving cells operating on the PCC and SCC respectively. The serving cell is interchangeably called as Primary Cell (PCell) or Primary Serving Cell (PSC). Similarly the secondary serving cell is interchangeably called as Secondary Cell (SCell) or Secondary Serving Cell (SSC). Regardless of the terminology, the PCell and SCell(s) enable the UE to receive and/or transmit data. More specifically the PCell and SCell exist in DL and UL for the reception and transmission of data by the UE. The remaining non-serving cells on the PCC and SCC are called neighbor cells.

The CCs belonging to the CA may belong to the same frequency band (also referred to as intra-band CA) or to different frequency band (inter-band CA) or any combination thereof (e.g. 2 CCs in band A and 1 CC in band B). The inter-band CA comprising of carriers distributed over two bands is also called as Dual-Band-Dual-Carrier-HSDPA (DB-DC-HSDPA) in HSPA or inter-band CA in LTE. Furthermore the CCs in intra-band CA may be adjacent or non-adjacent in frequency domain (also referred to as intra-band non-adjacent CA). A hybrid CA comprising of intra-band adjacent, intra-band non-adjacent and inter-band is also possible. Using carrier aggregation between carriers of different technologies is also referred to as "multi-RAT carrier aggregation" or "multi-RAT-multi-carrier system" or simply "inter-RAT carrier aggregation". For example, the carriers from WCDMA and LTE may be aggregated. Another example is the aggregation of LTE and CDMA2000 carriers. For the sake of clarity the carrier aggregation within the same technology as described can be regarded as 'Intra-RAT' or simply 'single RAT' carrier aggregation.

The CCs in CA may or may not be co-located in the same site or base station or radio network node (e.g. relay, mobile relay etc.). For instance the CCs may originate (i.e. transmitted/received) at different locations (e.g. from non-located BS or from BS and RRH or RRU). The examples of combined CA and multi-point communication are DAS, RRH, RRU, CoMP, multi-point transmission/reception etc. The present invention also applies to the multi-point carrier aggregation systems.

The multi-carrier operation may also be used in conjunction with multi-antenna transmission. For example signals on each CC may be transmitted by the eNB to the UE over two or more antennas.

According to Rel-11 carrier aggregation, one or more SCell can also operate on an Additional Carrier Type (ACT), which is also called as New Carrier Type (NCT). An ACT or NCT is a SCC but the cells on NCT may contain reduced number of certain type of signals in time and/or in frequency domain. For example a cell on NCT may contain Cell specific Reference Signals (CRS) only in one subframe per 5 ms. The CRS may also be reduced in the frequency domain e.g. CRS over central 25 RBs even if cell BW is larger than 25 RBs. In a legacy carrier the CRS are transmitted in every subframe over the entire bandwidth. The SCell on NCT is therefore used for receiving data whereas important control information is mainly sent on the PCell which is transmitted on PCC. The PCC is always a normal legacy carrier i.e. contains all Rel-8 common channels and signals.

Inter-Frequency/Inter-RAT Measurements in Carrier Aggregation

A CA capable UE (intra-RAT or multi-RAT CA) has a wide band receiver (i.e. in case of intra-band contiguous CA) or multiple receivers (i.e. in case of inter-band CA). Hence such a UE may also be capable of performing measurements on non-serving carrier without measurement gaps. For example an intra-RAT-intra-band contiguous CA UE may be capable of measuring on inter-frequency without gaps.

It is mandatory for a UE supporting DC-HSUPA to measure on the DL frequency (carrier) associated with the secondary UL frequency (carrier) without compressed mode, as long as the secondary uplink frequency (carrier) is configured. A UE supporting the dual cell feature might be able to perform measurements without compress mode on the secondary DL frequency (carrier). Similarly a DB-DC-HSDPA UE may also have the capability to perform measurements without compressed mode on the DL secondary carrier, which belong to the second band jointly supported with the band of the primary DL carrier. In case of 4C-HS-DPA, the UE may also have the capability to perform measurements without compressed mode on the second and third DL carriers, which may belong to any of two bands i.e. band of the primary DL carrier or band jointly supported with the band of the primary DL carrier.

In LTE the CA capable UE is also required to perform measurements on the secondary DL carriers (also referred to as DL secondary cell or DL SCell). The DL SCell(s) may be adjacent to the DL primary carrier (also referred to as PCell) in case of intra-band contiguous CA. The DL SCells may belong to another band in case of inter-band non-contiguous CA.

A CA-capable UE (intra- or multi-RAT) also has the basic measurement capability of performing measurements on inter-frequency/inter-RAT using measurement gaps. Furthermore the intra-RAT CA capable UE supporting inter-frequency measurements without gaps (e.g. DC-HSUPA or DB-DC-HSDPA or LTE intra-band CA or LTE inter-band CA etc.) would still need measurement gaps/compressed mode to perform inter-RAT measurements. For example DC-HSUPA UE would require CM patterns to perform measurements such as GSM carrier RSSI on GSM carrier or RSRP/RSRQ on LTE carrier. For example LTE intra-band UE would require measurement gaps to perform measurements such as GSM carrier RSSI on GSM carrier or WCDMA CPICH measurements on the target WCDMA carrier.

Self-Organizing Network

The advanced technologies such as E-UTRAN and UTRAN employ the concept of Self-Organizing Network (SON). The objective of the SON entity is to allow operators to automatically plan and tune the network parameters and configure the network nodes.

The conventional method is based on manual tuning, which consumes enormous amount of time, resources and requires considerable involvement of work force. In particular due to the network complexity, large number of system parameters, IRAT technologies etc., it is very attractive to have reliable schemes and mechanism which could automatically configure the network whenever necessary. This can be realized by SON, which can be visualized as a set of algorithms and protocols performing the task of automatic network tuning and configuration. In order to accomplish this, the SON node requires measurement reports and results from other nodes e.g. UE, base station etc. The SON can also be used for automatically changing the state of cells from active to idle or vice versa.

The description now continues with a discussion of even more detailed aspects of embodiments consistent with the invention.

The network deployment scenarios imply that inter-RAT neighbor cells also might be intra-frequency neighbors. This means for example inter-RAT UTRA and E-UTRA cells may be deployed by an operator with the same center frequency. The standard does not provide any means for the UE to measure on such inter-RAT neighbors without requesting measurement gaps. Therefore in existing solution the network will have to provide measurements gaps to the UE in order to enable the UE to perform such measurements. This leads to throughput loss. The use of gaps also reduces the available radio time at the UE for doing measurements using gaps.

Accordingly, the present invention concerns adding support to allow a UE to carry out measurements on an inter-RAT intra-frequency neighbor cell without measurement gaps, although the UE otherwise would require gaps for inter-RAT measurements. More specifically, the following main embodiments may be summarized:

Methods in a UE of signaling of UE capabilities for measuring intra-frequency inter-RAT neighbors to a network node (e.g. base station, eNodeB, NodeB, positioning node etc.).

Methods in the UE and the network node to detect when channel numbers for different RATs map to the same physical frequency.

Methods in UE to support low-pass filtering and potentially sample rate conversion to handle cases where e.g. the serving cell has a wider bandwidth than the measured inter-RAT intra-frequency neighbor.

The terms intra-frequency inter-RAT carriers or cells refer to the scenario where at least two cells of different RATs operate on the same carrier frequency. In one example the same carrier can be the serving carrier of the UE also referred to as intra-frequency carrier i.e. carrier on which UE's serving cell operates. In yet another example the carriers on which cells of different RATs operate may also be a non-serving carrier of the UE also referred to as inter-frequency carrier. In both examples the common aspect is that the cells of different RATs operate on the same carrier. The concept of 'same carrier' herein means that the cells of different RATs have the same center frequency even if their bandwidths can be different. However due to imperfections such as due to errors in clocks, timing, phase, frequency etc., the center frequencies of such cells may not be perfectly aligned. Instead in practice of the center frequencies of at least two cells each of different RATs are aligned within certain frequency error (e.g. ±0.1 ppb for macro cells) then such cells are considered to operate on the same carrier. If this carrier is that of the serving cell of the UE then this can be regarded as the intra-frequency inter-RAT scenario also referred to as serving carrier inter-RAT scenario. If this carrier is a non-serving carrier of the UE then this can be regarded as the inter-frequency inter-RAT scenario also referred to as non-serving carrier inter-RAT scenario.

According to the basic embodiment the UE indicates its capability if it supports intra-frequency inter-RAT measurement of cells without gaps.

However according to an embodiment the UE also indicates its capability if it supports inter-frequency inter-RAT measurement of cells. These measurements though require gaps. However the UE can still measure simultaneously cells of different RATs in a gap since they operate on the same carrier. This for example may improve performance since measurement period, cell identification time etc. may be reduced. The embodiments are described with primary focus on intra-frequency inter-RAT scenario. However the embodiments are also applicable for inter-frequency inter-RAT scenario.

The network deployment scenario is illustrated in FIG. 1, which shows a system 100 comprising first cell(s) 101, 102 and second cell(s) 103, 104. Moreover, each cell comprises its own respective base station 105, 106, 107, 108. In FIG. 1, the several cells 101, 102, 103, 104 from different RATs (plain portion, hatched portion) coexist on the same carrier frequency.

Figure 2:
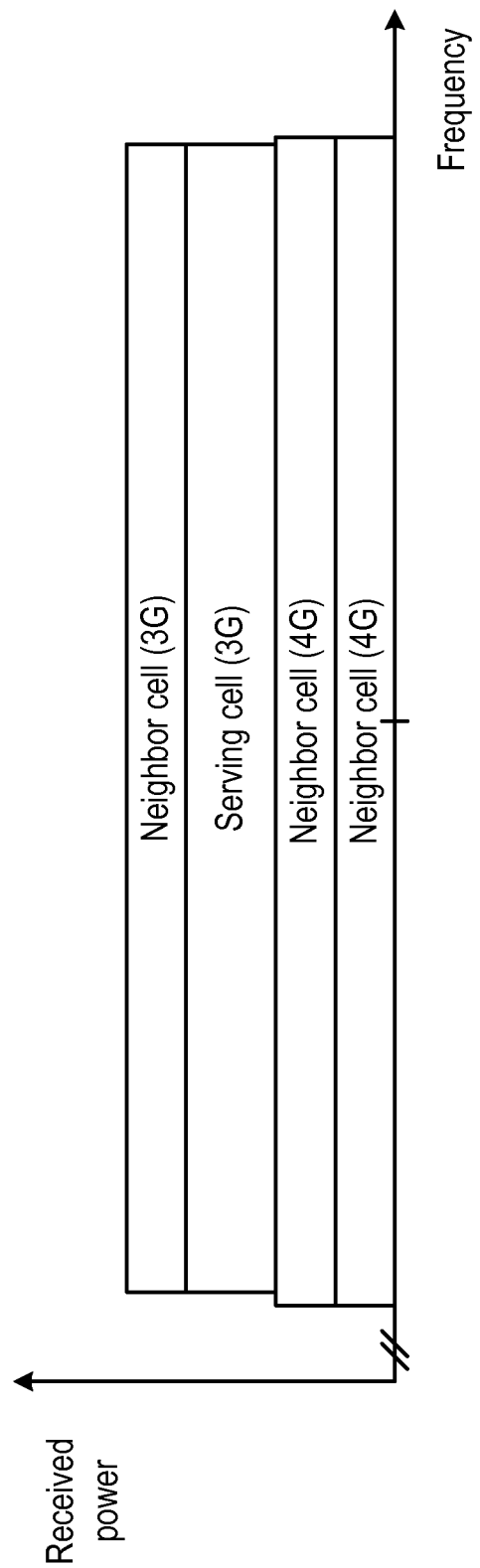
FIG. 2 shows in illustration of signal power received by the UE, wherein several cells for different RATs are overlapping each other in frequency and are received at the same time.

The UE is able to receive signals from all of those cells simultaneously, as illustrated in FIG. 2, where for instance WCDMA cells are overlapped by 5 MHz LTE cells, or TD-SCDMA cells are overlapped by a 1.4 MHz LTE cell. The sketch shows 3G and 4G cells of roughly the same downlink system bandwidth, but in the general case the downlink system bandwidth of the different RATs that coexist on the same carrier may be different, e.g. a 20 MHz LTE cell that is overlapping a 5 MHz WCDMA cell.

Figure 3A:
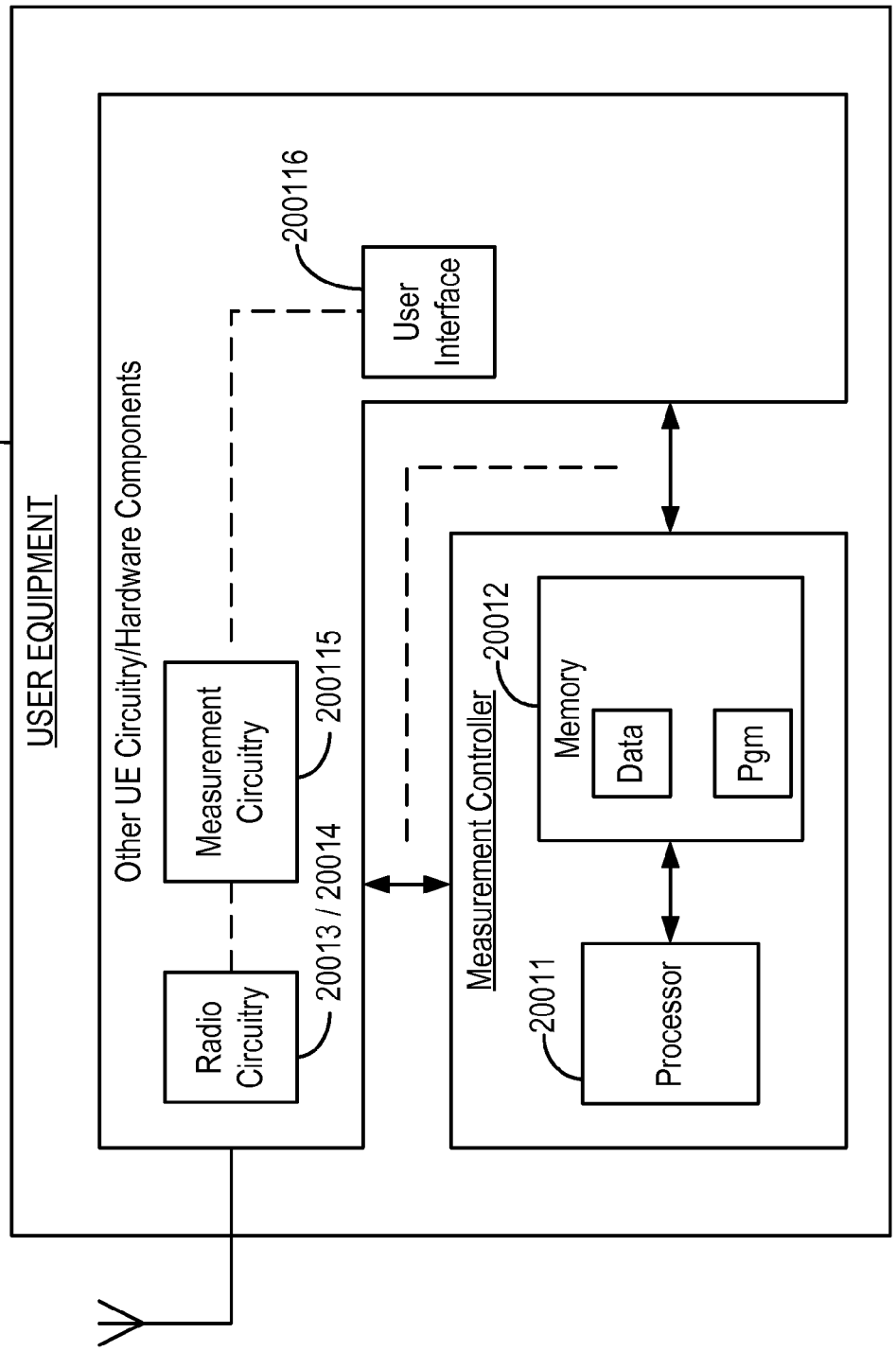
FIG. 3A shows a block diagram illustrating additional UE hardware. This is a processor-implemented embodiment, but alternative embodiments may use hardwired elements or a combination of both. The indicated "Pgm" may cause a processor to carry out UE processes such as that illustrated in FIGS. 4, 4A and 6.

FIG. 3 shows a general embodiment of the UE 2001 and the network (NW) node 2002. FIG. 3A shows a block diagram illustrating additional UE hardware. This is a processor-implemented embodiment, but alternative embodiments may use hardwired elements or a combination of both. The indicated "Pgm" may cause a processor to carry out UE processes such as those described below and illustrated in FIGS. 4, 4A and 6. As shown in FIG. 3, the UE 2001 comprises a core functionality (e.g., one or more of a Central Processing Unit (CPU), dedicated circuitry and/or a software module) 20011, a memory (and/or database) 20012, a transmitter 20013 and a receiver 20014. Moreover, the UE 2001 comprises a configurator 20015, an optional low-pass filter 20016, an optional signaler 20017, an optional reporter 20018 (which may be part of the signaler 20017), an optional mapper 20019, an optional comparator 200110, an optional determiner 200111, an optional performer 200112, an optional definer 200113, and an optional detector 200114.

As shown in FIGS. 3 and/or 3A, the UE 2001 may further comprise an optional measurer (measurement circuitry) 200115 and an optional user interface 200116.

In turn, as shown in FIG. 3, the NW node 2002 comprises a core functionality 20021, a memory (and/or database) 20022, a transmitter 20023 and a receiver 20024.

Figure 3B:
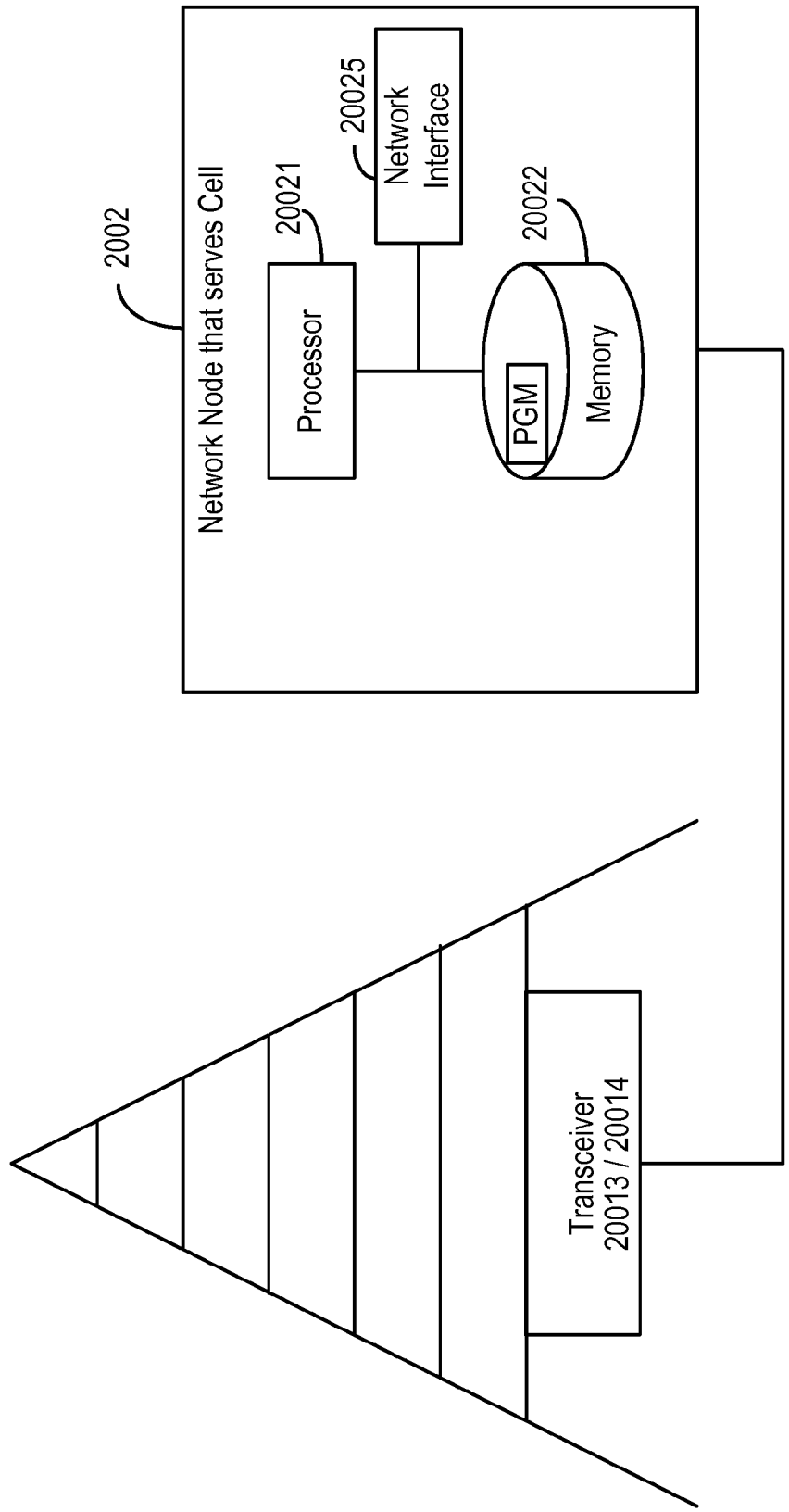
FIG. 3B shows a block diagram illustrating NetWork (NW) node hardware. This is a processor-implemented embodiment, but alternative embodiments may use hardwired elements or a combination of both. The indicated "PGM" may cause a processor to carry out network processes such as that illustrated in FIGS. 4, 4A and 7.

FIG. 3B shows a block diagram illustrating NetWork (NW) node hardware. This is a processor-implemented embodiment, but alternative embodiments may use hardwired elements or a combination of both. The indicated "PGM" may cause a processor to carry out network processes such as those described below and illustrated in FIGS. 4, 4A and 7.

As shown in FIGS. 3 and 3B, the NW node 2002 may further comprise an optional network interface 20025.

As indicated by the dashed extensions of the functional blocks of the CPU 200$x$1 (wherein $x$=1 and/or 2), the configurator 20015, the low-pass filter 20016, the signaler 20017, the reporter 20018, the mapper 20019, the comparator 200110, the determiner 200111, the performer 200112, the definer 200113, the detector 200114, the measurer 200115 and the user interface 20016 (of the UE 2001) and the network interface 20025 (of the NW node 2002) as well as the memory 200$x$2, the transmitter 200$x$3 and the receiver 200$x$4 may at least partially be functionalities running on the CPU 200$x$1, or may alternatively be separate functional entities or means controlled by the CPU 200$x$1 and supplying the same with information. For both the UE 2001 and the NW node 2002, the transmitter and receiver components 200x3, 200x4 may be realized to comprise suitable interfaces and/or suitable signal generation and evaluation functions.

The CPU 200x1 may be configured, for example, using software (cf. FIG. 3A, Pgm; FIG. 3B, PGM) residing in the memories 200x2, to process various data inputs and to control the functions of the memory 200x2, the transmitter 200x3 and the receiver 200x4 (as well as the configurator 20015, the low-pass filter 20016, the signaler 20017, the reporter 20018, the mapper 20019, the comparator 200110, the determiner 200111, the performer 200112, the definer 200113, the detector 200114, the measurer 200115 and the user interface 20016 (of the UE 2001) and the network interface 20025 (of the NW node 2002)). The memory 200x2 may serve for storing program code for carrying out the methods according to the aspects disclosed herein, when executed by the CPU 200x1.

It is to be noted that the transmitter 200x3 and the receiver 200x4 may be provided as an integral transceiver or radio circuitry, as is indicated in FIG. 3 or 3A. It is further to be noted that the transmitters/receivers 200x3, 200x4 may be implemented as physical transmitters/receivers for transceiving via an air interface or a wired connection (e.g., between the UE 2001 and NW node 2002 when they are embodied separate entities), as routing/forwarding entities/interfaces between network elements, as functionalities for writing/reading information into/from a given memory area or as any suitable combination of the above. At least one of the above-described configurator 20015, low-pass filter 20016, signaler 20017, reporter 20018, mapper 20019, comparator 200110, determiner 200111, performer 200112, definer 200113, the detector 200114, the measurer 200115 and the user interface 20016 (of the UE 2001) and the network interface 20025 (of the NW node 2002) or the respective functionalities, may also be implemented as a chipset, module or subassembly.

Figure 4A:
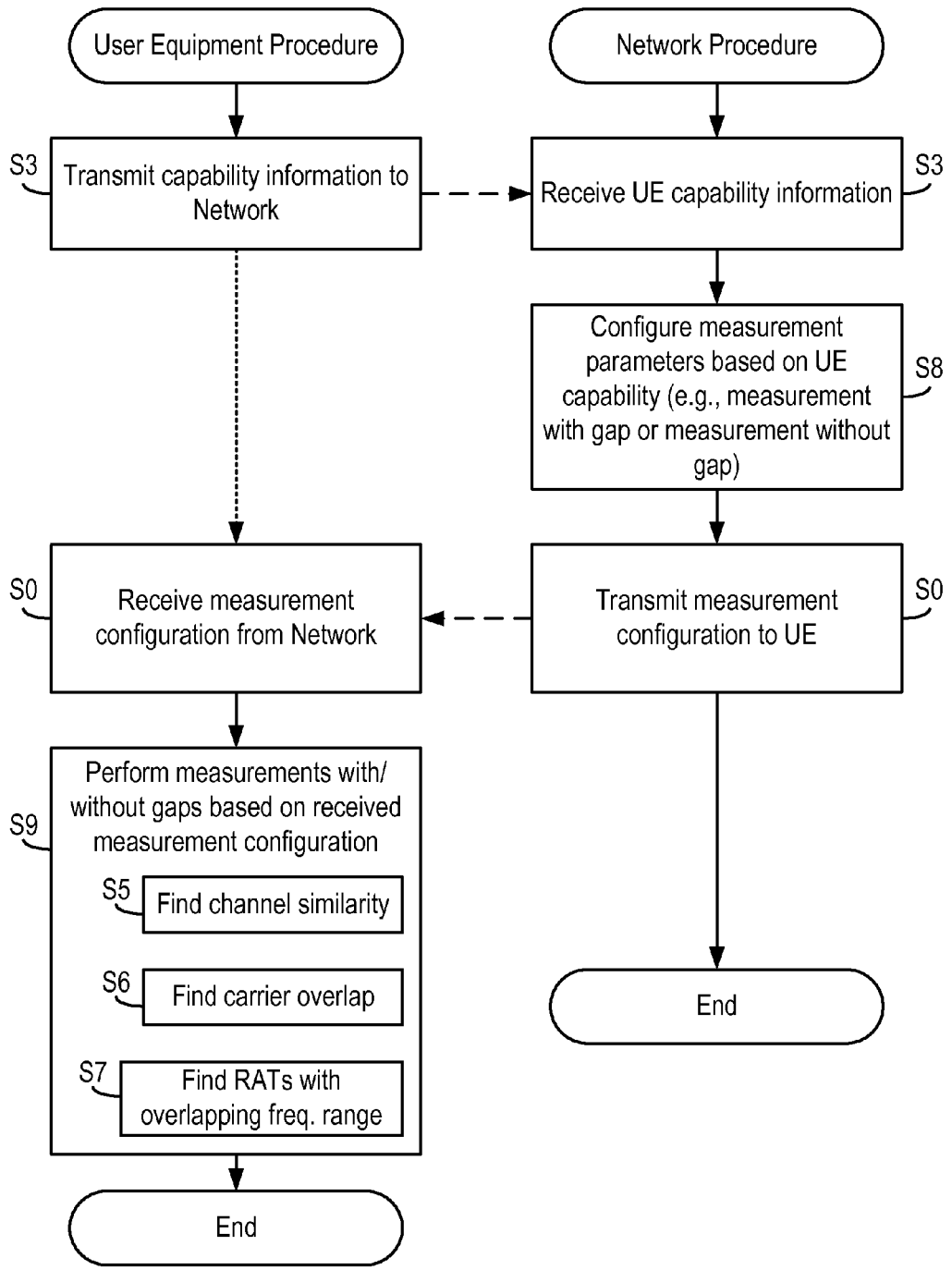
FIG. 4A shows flowcharts of the method of FIG. 4, illustrating processes and interactions between the UE and the NW node for configuring and performing measurements with or without a gap.

FIGS. 4 and 4A illustrate an embodiment of a method for cell measurement on at least two cells. In the signaling diagram of FIGS. 4 and 4A, signaling between elements is indicated in the horizontal direction, while time aspects between signaling are reflected in the vertical arrangement of the signaling sequence as well as in the sequence numbers. It is to be noted that the time aspects indicated in FIGS. 4 and 4A do not necessarily restrict any one of the method steps shown to the step sequence outlined in FIGS. 4 and 4A. This applies in particular to method steps that are functionally disjunctive with each other.

FIG. 5 shows a part of the receiver 20014 that allows the received antenna streams (one or more) to be split into two sets of streams that are low-pass filtered in the low-pass filter 20016 over bandwidths BW0 and BW1, respectively. BW0 may be used for data demodulation and BW1 for inter-RAT intra-frequency measurements. The branch (BW0 or BW1) that is used for intra-frequency and/or inter-frequency measurements may depend on RAT and serving cell bandwidth. In a scenario where e.g. serving cell is a 20 MHz LTE cell and the inter-RAT intra-frequency neighbor cell is a WCDMA cell, BW0 may be tuned to pass about 18 MHz whereas BW1 would be tuned to pass the necessary bandwidth for WCDMA measurements. In a scenario where both the serving cell and the inter-RAT intra-frequency neighbor cell have about the same bandwidth, the role of the filter BW1 could be to spectrally shape the received signal properly.

The scenario of overlapping cells from different RATs is shown in FIG. 1 for LTE and HSPA (WCDMA or TD-SCDMA). However, the embodiments are applicable to any combination of RATs. Examples of RATs whose cells can overlap on the same carrier frequency are LTE FDD, LTE TDD, UTRA FDD, UTRA TDD, GSM, GERAN, EDGE, CDMA2000, HRPD, WiMAX etc. Furthermore the embodiments are also applicable regardless of the RAT of the serving cell and neighbor cells provided the cells have the same carrier frequency. For example according to the disclosed method the UE 2001 when served by LTE cell can measure on WCDMA neighbor cells without measurement gaps when the LTE serving and WCDMA cells operate on the same carrier frequency. In this example the UE 2001 can also measure on LTE neighbor cells when UE 2001 is served by the WCDMA cell. Same explanation applies to other RATs.

Embodiment 1: UE 2001 Reporting of Capabilities and Usage by the Network

This embodiment is described with reference to FIGS. 3B, 4, 4A and 7.
UE Capability Information
Intra-Frequency Inter-RAT Measurement Capability Reporting The UE 2001 reports capabilities "intra-frequency inter-RAT capabilities" (S8-1) to the network node (e.g. any serving radio node, eNode B, Node B, RNC, BSC, positioning node, core network node etc.). This information is given per RAT combination (taking into account which RAT is active and which RAT is passive). For example the UE 2001 may report the capability information, which may be expressed in any of the following manner:
- UE 2001 is capable of measuring intra-frequency inter-RAT cells for all its supported RATs without measurement gaps.
- UE 2001 is capable of measuring intra-frequency inter-RAT cells for specific combination of supported RATs e.g. for RAT1, RAT2 and RAT3 where as an example RAT1, RAT2 and RAN3 are LTE, WCDMA and GSM respectively.
- UE 2001 is capable of measuring those inter-RAT cells for all and/or subset of supported RATs without measurement gaps provided the inter-RAT cells operate on the same carrier as that of the intra-frequency carrier (i.e. serving carrier or carrier of serving cell).
- UE 2001 is capable of measuring those inter-RAT cells for all and/or subset of supported RATs without measurement gaps provided the inter-RAT cells whose center frequencies are the same or at least they are accurate within certain limit (e.g. ±0.1 ppb).

Moreover the capability may also be specified per frequency band. In this case the UE 2001 will report the intra-frequency inter-RAT capabilities and the corresponding frequency bands for which the measurement without gaps can be performed provided inter-RAT cells operate on same carrier as that of the serving cell. For example the UE 2001 may indicate that it can perform intra-frequency inter-RAT measurements without gaps for LTE and WCDMA on band 1 (2100 MHz), band 2 (1900 MHz) and band 8 (900 MHz). In another example the UE 2001 may indicate that it supports this capability for all bands which are in certain frequency ranges. Examples of frequency ranges are between 900 MHz to 2.6 GHz, bands below 1 GHz, bands above 2 GHz etc. In yet another example the UE 2001 may indicate that it supports this capability for all bands which are common for certain set of RATs. For example the UE 2001 may support this capability for E-UTRA FDD bands 1-26 and UTRA FDD bands I-XXVI.

Additionally, the capability may be conditioned on the serving cell bandwidth and the downlink system bandwidth of the target cell. If connected to a 3 MHz LTE cell some UE implementations might not be able to measure an overlapping WCDMA cell (5 MHz bandwidth), but if the LTE cell is as wide or wider than the WCDMA cell, the same UE implementations would be able to do the measurements. Vice versa if connected to a WCDMA cell (5 MHz bandwidth) and doing measurements on an overlapping 10 MHz LTE cell, some UE implementation may be able to do measurements only over the serving cell bandwidth (5 MHz) whereas other implementations might be able to do the same measurements over a wider bandwidth. For LTE it is possible to do measurements on bandwidths down to 1.1 MHz. Concretely for each RAT combination the capability information may include whether the intra-frequency inter-RAT measurements can be carried out without gaps over certain bandwidth or certain measurement BW i.e. a parameter related to measurement BW of all or combination of RATs. Examples of the parameter related to measurement BW over which the UE 2001 can measure intra-frequency inter-RAT cells as indicated in capability information are:

Serving cell bandwidth.
Serving cell bandwidth if serving cell belong to a certain RAT e.g. UTRA FDD.
BW larger than that of the serving cell BW.
Over any BW.
Over a specified bandwidth.
Over certain maximum BW e.g. 10 MHz.
Over maximum bandwidth of a particular RAT.
Over maximum bandwidth of all intra-frequency inter-RAT cells.
Over maximum bandwidth of all supported RATs.
Common BW of all intra-frequency inter-RAT cells e.g. 5 MHz in case LTE operate over 10 MHz and HSPA over 5 MHz.

The reported capability may contain even more information. For instance, the additional capability information may indicate the types of intra-frequency inter-RAT measurements which can be performed without gaps. For example UE 2001 may indicate that it can perform mobility measurements such as inter-RAT UTRA FDD cell search, CPICH RSCP and CPICH Ec/No on indicated bands. In another example UE 2001 may indicate that it can perform, log and report measurements for MDT, positioning etc. on indicated bands.

The UE 2001 may also indicate whether intra-frequency inter-RAT measurement capability applies to all or specific number of carriers out of the supported carriers in case UE 2001 is multi-carrier capable. For example a UE 2001 may indicate that it is capable of doing intra-frequency inter-RAT measurements on primary and one secondary carrier when configured for multi-carrier operation.

The additional capability information may indicate that the UE 2001 can measure cells on intra-frequency inter-RAT carrier provided the frequency error between serving cell's carrier and the inter-RAT carrier is within a certain limit (e.g. within ±0.1 ppb). The UE 2001 may also indicate that if the center frequencies of the cells of different RATs are aligned within certain level of frequency error (e.g. within ±0.2 ppb) then the UE 2001 considers these cells to operate on the same carrier and in this case the UE 2001 can measure these cells without measurements gaps.

The additional capability information may also indicate that the can acquire System Information (SI) of a cell on an intra-frequency inter-RAT carrier using autonomous gaps while meeting at least one or more intra-frequency requirements; for example UE 2001 may meet intra-frequency side conditions such as SNR or SINR (e.g. SCH Ec/Iot down to −6 dB) or signal strength (e.g. RSRP down to −127 dBm for band 1 (2100 MHz)) of received signals if inter-RAT cell is E-UTRA.

Inter-Frequency Inter-RAT Measurement Capability Reporting

As stated earlier, the embodiments also cover the inter-frequency inter-RAT scenario. Therefore the UE 2001 may also indicate its capability to the network node that it supports measurements of cells of different RATs on a neighboring carrier frequency (non-serving carrier) if they operate on the same carrier (i.e. inter-frequency inter-RAT measurements). Though as stated earlier the UE 2001 will require gaps in this case, However UE 2001 can measure such cells of different RATs in parallel or at the same time without the need for switching or tuning RF to different carriers. The UE 2001 may also indicate the number of carriers which it can support as inter-frequency inter-RAT for monitoring them in parallel. The parallel monitoring means for examples the carriers which can be requested by the network node to measure e.g. request is sent by the network node in the same measurement configuration to the UE 2001. The reported capability may also be specific to certain bands, measurement types, RATs etc. Therefore the additional information associated with intra-frequency inter-RAT measurement capability described above also applies for inter-frequency inter-RAT measurement capability.

According to yet another aspect it may be pre-defined that if UE 2001 indicates that it is capable of performing intra-frequency inter-RAT measurements without measurements gaps then the UE 2001 can also perform inter-frequency inter-RAT measurements (latter requires gaps). The pre-defined rule can also comprise of additional information such the number of carriers which are supported by such a UE 2001 i.e. number of inter-frequency inter-RAT carriers. Based on this pre-defined rule the UE 2001 will measure inter-frequency inter-RAT cells in gaps at the same time.

It may also be pre-defined that if UE 2001 indicates that it is capable of intra-frequency inter-RAT measurements then no measurement gaps are required. Therefore when network receives this capability information it does not configure gaps provided there are intra-frequency inter-RAT cells in the coverage area.

Capability Reporting Mechanism (S8-1)

The UE 2001 may signal the above mentioned capability information described above to the network node in any of the following manner:

Proactive reporting without receiving any explicit request from the network node (e.g. serving or any target network node)
Reporting upon receiving any explicit request from the network node (e.g. serving or any target network node)

The explicit request can be sent to the UE 2001 by the network anytime or at any specific occasion. For example the request for the capability reporting can be sent to the UE 2001 during initial setup or after a cell change (e.g. handover, RRC connection re-establishment, RRC connection release with redirection, PCell change in CA, PCC change in PCC etc.).

In case of proactive reporting the UE 2001 may report its capability during one or more of the following occasions:

During initial setup or call setup e.g. when establishing the RRC connection
During cell change e.g. handover, primary carrier change in multi-carrier operation, PCell change in multi-carrier operation, RRC re-establishment, RRC connection release with redirection etc.

The capability information may be sent to the network node using a suitable protocol. For example the UE 2001 may use RRC protocol when sending its capability information to eNode B in LTE and to RNC in HSPA (UTRA FDD or UTRA TDD). In another example the UE 2001 may use LPP protocol when sending its capability information to the positioning node (e.g. E-SMLC) in LTE.

Method in Network Node of Autonomously Determining the UE Capability

According to this embodiment the network node may also autonomously determine whether a UE is capable of performing intra-frequency inter-RAT measurements and/or inter-frequency inter-RAT measurements. The network node may also autonomously determine whether a UE is capable of performing intra-frequency inter-RAT measurements without measurement gaps. The network node may also autonomously determine whether a UE is capable of performing intra-frequency inter-RAT measurements without measurement gaps on each or subset of carriers (e.g. primary carrier, secondary carrier(s)) when using multi-carrier operation.

According to one aspect of this embodiment the UE autonomously determines the UE capability based on the first set of information, which is related to the measurement results received by the UE. More specifically the network node determines this by comparing the requirement (e.g. measurement requirements, performance requirements etc) of the reported measurement results with the pre-defined requirements. A well known example of pre-defined requirement is a measurement duration over which the UE performs a measurement. So for example if certain inter-RAT measurement is performed over a duration which is shorter than the pre-defined duration of the measurement by a certain margin then the network may assume that the UE is capable of performing certain set of intra-frequency inter-RAT measurements and/or inter-frequency inter-RAT measurements. Based on these measurement results the network node may also determine whether intra-frequency inter-RAT measurements are done without gaps. For example when measuring without gaps the intra-frequency inter-RAT measurement may be done over a shorter time and may also affect the performance of other measurements done using gaps. For example other measurements will have more time in gaps and therefore their overall delay will also be reduced. The network may also use the second set of information, which is related to the carrier frequencies of the inter-RAT cells to further confirm the autonomous determination of the UE capability of measuring intra-frequency inter-RAT carriers (with or without gaps) and/or inter-frequency inter-RAT carriers. For example if the carrier frequencies of certain inter-RAT cell (e.g. WCDMA) and of intra-frequency cell (e.g. LTE FDD) have the same center frequency (e.g. at least within certain frequency error) and the requirement met by the UE measurement reported result(s) indicates that the UE has measured this inter-RAT cell without gap then the network node assumes that the UE is capable of measuring the intra-frequency inter-RAT cells without gaps (i.e. for LTE and WCDMA cells). The network can determine UE capability also for other RATs and on other carriers e.g. by sending measurement configuration and by observing the reported results. The network can also determine if the UE is using measurement gaps for certain inter-RAT measurements or not by using a second set of information. The second set of information may comprise observations of the signals transmitted by the UE during the sub frames or time periods which overlap with the gaps in the uplink. The measurement gaps used also for downlink measurements are created by the UE in both uplink and downlink direction i.e. UE neither receives nor transmits in sub frames when UE measures using gaps. For example if the network suspects (e.g. based on measurements i.e. first set of information) that the UE is capable of intra-frequency inter-RAT measurements without gaps then the network may only configure those RATs on which the UE can do these measurements and the network also configures the measurements gaps. If uplink signals transmitted by the UE are received at the network node and the UE is able to perform certain intra-frequency inter-RAT measurements then it may assume that the UE can measure intra-frequency inter-RAT measurements without gaps. The network node can maintain such a history in a memory and therefore can use this in the future when sending measurement configuration to the UE. The network node may also forward the information related to the determined UE capability to other network nodes as explained in later embodiments. The use of first, second and third sets of information for autonomously determining the UE capability at the network node leads to more authentic determination of the said UE capability.

Method in Network Node of Using UE 2001 Acquired Capability (S8-2 to S8-7)

The acquired capability information, which is based on UE signaling and/or autonomous determination by the network, may be used by the network node for taking one or more network operation tasks or actions (also referred to as RRM tasks, radio operation tasks etc.). Examples of network operation task are:

Decision in the network node (e.g. eNodeB) whether to configure UE 2001 to perform intra-frequency inter-RAT measurement or not (S8-2 and S8-3).

Decision in the network node (e.g. eNodeB) whether to configure UE 2001 with the measurement gaps or not when requesting it to perform inter-RAT measurements (S8-4).

The type of information which should be sent in measurement configuration by network node and/or in assistance data for positioning by positioning node.

Determine for which inter-RAT carriers measurement gaps need to be configured (S8-5).

In case several inter-RAT carriers are configured but one or more of them (combining Embodiments 1 and 2) can be measured without gaps (S8-6), the network has the option to configure a sparser measurement gap sequence (e.g. gaps with 80 ms periodicity rather than gaps with 40 ms periodicity in LTE) than otherwise would be needed.

In case a UE 2001 has signaled "intra-frequency inter-RAT capabilities" and at the same time that it can only do measurements over the serving cell system bandwidth, and the serving cell system bandwidth is smaller than the least bandwidth needed for measurements on the inter-RAT intra-frequency neighbor cell, the network configures the UE 2001 with measurement gaps (S8-7).

Forwarding the capability information and/or statistics about the UE 2001 supporting this capability to other network nodes. The radio network node may send the information to other network nodes in real time or within a certain delay. The radio network node may also collect statistics over certain period of time and report the statistics to the other network nodes. Examples of other network nodes are neighboring base stations (e.g. eNodeB sending to other eNodeB over an X2 interface e.g. at cell change), positioning node (E-SMLC in LTE), third node, MDT node, SON nodes, O&M node, OSS node, network monitoring node, network planning node etc. The other network node receiving the above set of information may use it for one or more additional network management tasks. Examples of network management tasks are network/cell planning, configuration of network parameters, improving frequency synchronization of carriers, network dimensioning, deployment of RATs, assignment of carriers to different RATs, neighboring node using the received information for measurement configuration for a UE 2001 after cell change of the UE 2001 etc.

Embodiment 2: Detection of Overlapping Carrier Frequencies (Intra-Frequency)

Figure 6:
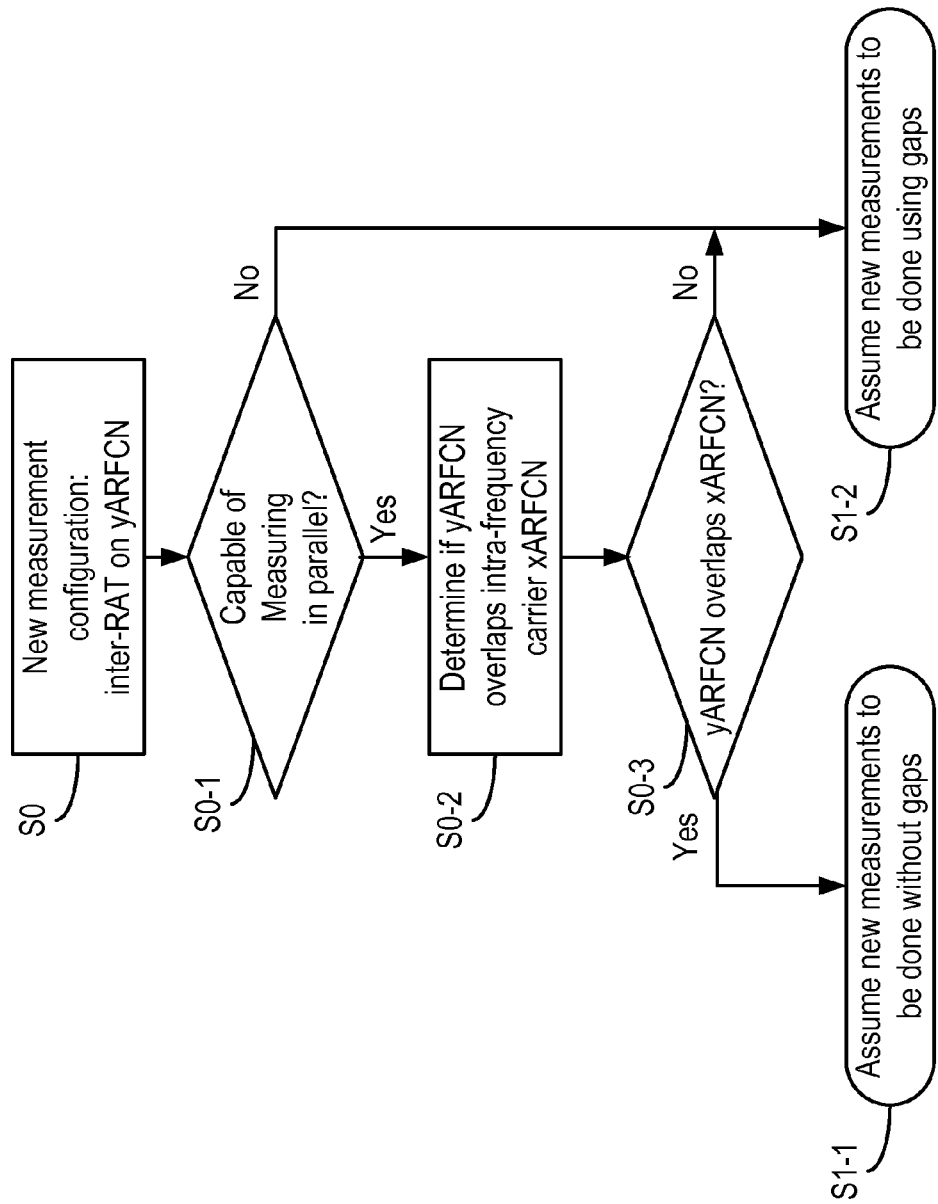
FIG. 6 shows a flow chart of a UE algorithm for determining whether inter-RAT measurements can be carried out with single receiver chain without gaps.

This embodiment is described with reference to FIGS. 3A, 4, 4A and 6 (S0 to S1-2). More particularly, FIG. 3A shows a block diagram illustrating additional UE hardware. This is a processor-implemented embodiment, but alternative embodiments may use hardwired elements or a combination of both. The indicated "Pgm" may cause a processor to carry out UE processes such as that illustrated in FIGS. 4, 4A and 6. FIG. 4 shows a method embodiment which also reflects the interactions 200 between the components of the device embodiment. FIG. 4A shows flowcharts of the method of FIG. 4, illustrating processes and interactions between the UE and the NW node for configuring and performing measurements with or without a gap. FIG. 6 shows a flow chart of a UE algorithm for determining whether inter-RAT measurements can be carried out with single receiver chain without gaps.

As seen in FIG. 4A, the UE signals to a network node, the UE's capability for performing measurements on the first and second cells being intra-frequency inter-RAT neighboring cells, and the network node receives this information (S3). Based on the received signaling (indicating UE capability such as measurement with gap or measurement without gap), the network node performs processing in the form of configuring measurement parameters (S8).

The network node 2002 transmits and the UE 2001 receives (20014) a measurement configuration message from the network node that includes one or more new inter-RAT carrier(s) (i.e. carrier frequency such as ARFNC parameter and the associated RAT) on which the UE 2001 is requested to perform one or more measurement (S0). The configuration message may also contain additional information such as measurement bandwidth, higher layer time domain filtering parameter for measurement etc. The message may also contain measurement gap information. The measurement configuration message or another message sent to the UE 2001 may also include new information not covered in prior art. Examples of new information are:

Information related to the relative frequency error or frequency error between one or more set of intra-frequency inter-RAT carriers.

Indication or information regarding the set of RATs whose carriers are aligned i.e. set of intra-frequency inter-RAT carriers.

There may also be a pre-defined rule that if the network does not provide measurement gaps but requests that the UE 2001 measure inter-RAT cells, then the UE 2001 may assume that these RATs operate on the same carrier as that of the serving cell. The UE 2001 can of course further verify this e.g. by using the ARFNC as explained below.

The UE 2001 may receive the message for measuring in low activity state (e.g. idle state) and/or in connected state. Based on the received measurement configuration information, the UE 2001 then performs measurements with or without gaps (S9). Looking at these steps in greater detail, step S9 comprises finding channel number similarity (S5), finding carrier overlap (S6), and finding RATs with overlapping frequency ranges (S7). Step S5 comprises mapping (S5a) both a first channel number contained in the measurement configuration message and a second channel number for the serving carrier to a physical frequency; comparing (S5b) the first and second channel number; and determining (S5c) based on the comparing, a degree of similarity between the first and second channel numbers.

Step S6 comprises determining (S6a) whether an inter-frequency carrier overlaps a new inter-RAT carrier; and if the determining is affirmative, performing the measurement simultaneously (S6b).

Step S7 comprises autonomously detecting one or more cells of different RATs having an overlapping frequency range (S7a) and then reporting this information (S7b).

The UE 2001 is capable of intra-frequency inter-RAT measurements for the particular combination of RATs. As stated above the UE 2001 may also be informed by the network node that a particular combination of RATs operate on the same carrier. However the UE 2001 may still verify this as explained further. If the UE 2001 is capable of measuring in parallel (S0-1), then for each carrier in the measurement configuration the UE 2001 determines whether it overlaps the intra-frequency carrier (S0-2). This is done for instance by mapping (20019) the channel number (ARFCN, UARFCN or EARFCN) in the measurement configuration as well as the channel number for the intra-frequency carrier to physical frequencies (also referred to as carrier frequency, which is typically expressed in GHz, MHz or kHz), and then comparing (200110) whether they are similar (S0-3, 200111). How channel numbers relate to physical frequency can be found in e.g. 3GPP TS 25.104 for WCDMA and in 3GPP TS 36.104 for LTE as also described above. For example the UE 2001 may verify whether the carrier frequencies (i.e. physical carrier frequency) of the RATs for doing measurements have the same center frequency.

In case it is found that an inter-RAT carrier in the measurement configuration overlaps the intra-frequency carrier, the UE 2001 plans measurements without gaps for that concerned inter-RAT carrier (S1-1).

In case there are several inter-RAT carriers, and the UE 2001 is configured with measurement gaps, the UE 2001 only measures the inter-RAT carriers that do not overlap the intra-frequency carrier using the gaps (S1-2); the inter-RAT carrier that overlaps the intra-frequency carrier is measured without gaps. The UE 2001 may also measure on inter-RAT carriers without gaps if their center frequencies are aligned within at least certain margin of frequency error e.g. within ±0.1 ppb. The UE 2001 may determine the frequency error between inter-RAT carriers based on one or more of the following:

Received information from the network node.
Based on pre-defined requirements.
Based on measurements performed by the UE 2001.
Based on historical data e.g. earlier measurements.

If the number of inter-RAT carriers that overlap with the intra-frequency carrier is above a threshold (e.g. 4) then the UE 2001 may measure only on selected inter-RAT carriers without gaps. In other words the UE 2001 may use different measurement procedure in case there is at least a certain number of intra-frequency inter-RAT cells. The remaining intra-frequency inter-RAT carriers (e.g. M out of N) can be measured using the following options in that they are:
- Measured in measurement gaps.
- Measured after measuring (N-M) intra-frequency inter-RAT carriers.
- Not measured at all.

The UE 2001 may select intra-frequency inter-RAT carriers for measurements without gaps based on:
- Indication received from the network node.
- Autonomous selection based on one or more criteria. Examples of criteria are:
  - Selecting carriers belonging to specific RAT(s) such as UTRA FDD or GSM carrier.
  - Selecting carriers on which measurements with gaps may require delay longer than a threshold.

In case there are several inter-RAT carriers, but the UE 2001 has not been configured with measurement gaps that can be used for the concerned inter-RAT measurements, and has not reported other capability on being able to measure inter-RAT carriers without gaps for the concerned band, the UE 2001 shall consider the measurement configurations for the inter-RAT carriers that do not overlap the intra-frequency carrier as incomplete and will not have to carry out measurements before gaps are provided; the inter-RAT carrier that overlaps the intra-frequency carrier shall however be considered valid and is to be measured without gaps.

After performing the measurements on the network indicated and/or UE 2001 selected or based on the combination, the UE 2001 may use the measurement results for one or more radio operational tasks (also referred to as RRM tasks). Examples of such tasks are:
- Cell reselection in low activity state.
- Cell reselection in low activity state.
- Reporting the result to the network node (e.g. radio node, RNC, eNB, positioning node etc.), which may use it for cell change, positioning, network planning etc.
- Logging the data and reporting the logged data to the network at specific instant e.g. when collected data exceed a threshold, after logged time period TO etc.
- For determining user location.

Embodiment 3: Detection of Overlapping Carrier Frequencies (Inter-Frequency)

This embodiment is described with reference to FIGS. 3A, 4, 4A and 6 (S0 to S1-2).

Similar to Embodiment 2, the UE 2001 uses the same methodology to determine (200111) whether an inter-frequency carrier overlaps a new inter-RAT carrier. If they overlap, the UE 2001 schedules the measurement activities simultaneously (200112). If the UE 2001 needs and have been provided gaps for the inter-frequency measurements, it carries out the concerned inter-RAT measurement in the same gap sequence (despite the measurement gap sequence purpose signaled by the network).

Embodiment 4: Pre-Determined Requirements Associated with UE Measurement Capability This embodiment is described with reference to FIGS. 4 and 4A.

According to this embodiment, the UE 2001 supporting the intra-frequency and/or inter-RAT measurement capability is required to meet a specific set of pre-defined requirements when such scenario (i.e. intra-frequency and/or inter-RAT cells are seen by the UE 2001) exists e.g. a second set of pre-defined requirements. The first set of pre-defined (200113) requirements is to be met by the UE 2001 which does not support the intra-frequency and/or inter-RAT measurement capability or such cells do not exist.

More specifically, this embodiment includes a method in a UE 2001 of meeting a second set of pre-defined requirements if the above scenario exists and UE 2001 supports this capability otherwise the UE 2001 meets the first set of pre-defined requirements.

Examples of pre-defined requirements as expressed earlier are: measurement accuracy, measurement period over which accuracy is to be met, measurement reporting delay, evaluation periods, cell identification reporting delay, number of cells over which one or more measurement is done over a measurement period etc.

According to another aspect of this embodiment one or more second set of pre-defined requirements may be more stringent than the corresponding first set of pre-defined requirements. For example the second set of measurement period may be shorter than the first set of measurement period for the same type of measurement. However some of the requirements may be the same e.g. the second set and the first set of measurement accuracies may be the same. A shorter second set of measurement period may also depend upon one or more factors such as the type of RATs, type of measurement (e.g. intra-frequency, inter-frequency), the number of cells to measure etc.

Embodiment 5: Autonomous Determination of Intra-Frequency Inter-RAT and/or Inter-Frequency Inter-RAT Cells by UE This embodiment is described with reference to FIGS. 3, 4 and 4A.

According to another aspect, the UE 2001 which is capable of intra-frequency inter-RAT and/or inter-frequency inter-RAT measurements may autonomously detect (200114) two or more intra-frequency inter-RAT cells and/or inter-frequency inter-RAT cells i.e. cells of different RATs which are overlapping in frequency.

The UE 2001 may report this information to the network node. The reported information may comprise identifiers of cells (e.g. PCI, CGI etc.), their carrier frequency, RAT type, results of measurements done on these cells, indication about the relative frequency error between different cells etc. The UE may also be pre-configured by the network node to log such information in case the UE ever detects intra-frequency inter-RAT and/or inter-frequency inter-RAT cells. The UE may also be pre-configured by the network node to log such information for certain configurations e.g. for certain set of RATs, bands, frequency range etc. The logged information can be reported by the UE when the UE has resources to send the measurement results. The network node which receives this information (e.g. serving eNodeB, RNC) may use this information for one or more network management task, which may also be related to SON. Examples of such tasks are:
- Determining the neighboring cells which are intra-frequency inter-RAT and/or inter-frequency inter-RAT cells.
- Updating the measurement configuration information which is sent to the UE for performing measurements. For example:
- If there is a certain number of intra-frequency inter-RAT neighbor cells then the network node may decide not to configure a measurement gap.

The UE may be requested to measure intra-frequency inter-RAT neighbor cells around the same time i.e. request sent in the same measurement configuration message or Information Element (IE).

Network planning, tuning of network parameters e.g. improving network synchronization such as frequency synchronization between cells of different RATs.

Forwarding the received information to other network nodes e.g. SON, MDT, OSS, O&M, positioning node etc. These nodes may also use the received information for one or more network management task listed above.

The present invention offers one or more of the following advantages:

The invention allows a higher throughput in network deployment scenarios where different RATs are deployed on the same carrier(s), since measurement gaps can be omitted or sparser measurement gap sequences can be used, in case one or more of the inter-RAT carriers can be measured at the same time as measurements are carried out for other RAT.

The UE is able to measure cells of different RATs at the same time. This may also result in shorter measurement period, lower power consumption since same RF is used for measuring on different RATs.

A number of embodiments that are consistent with the invention have been described. The following summarizes illustrated aspects of one or more of these embodiments.

Figure 7:
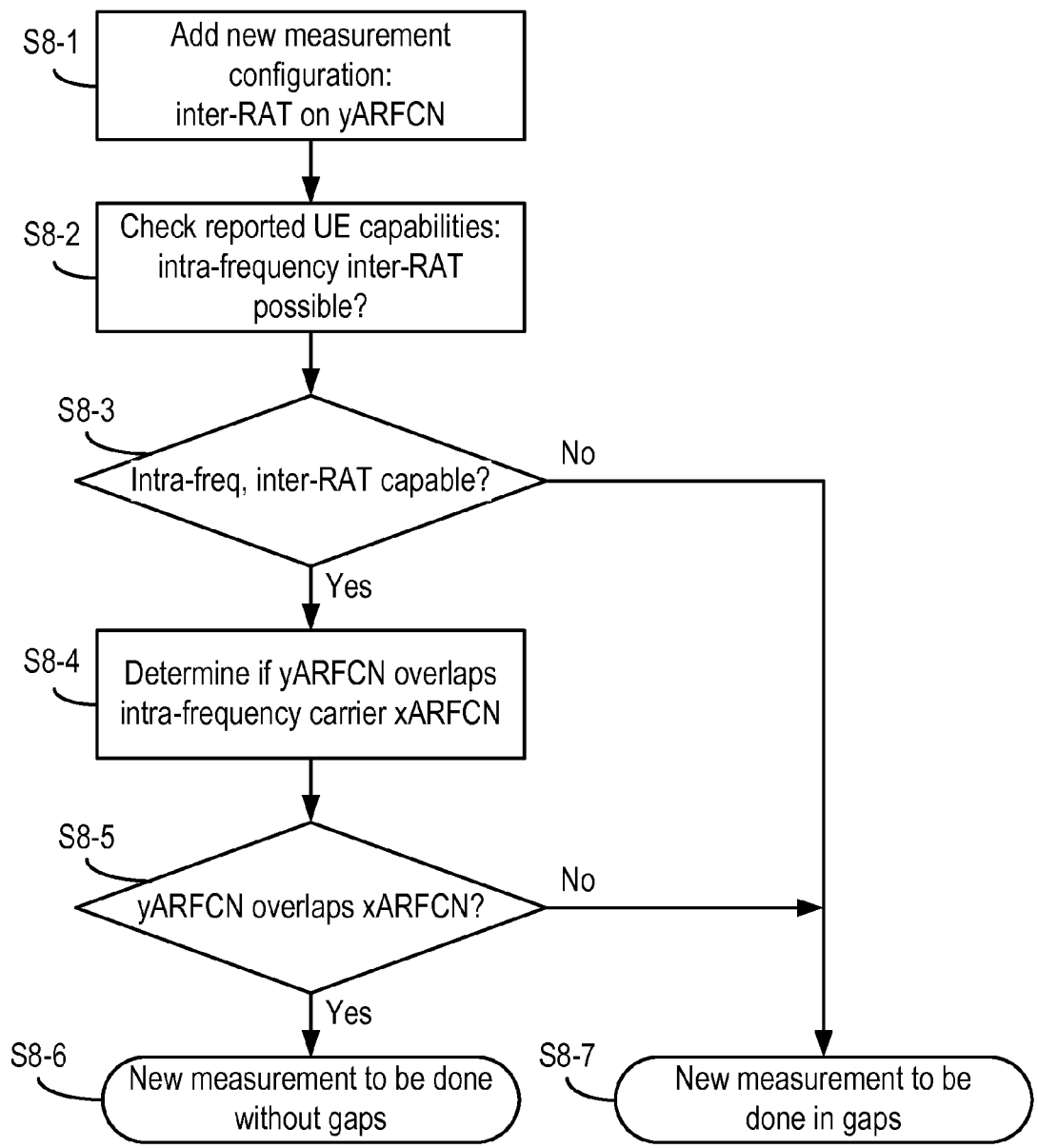
FIG. 7 shows a flow chart of a network algorithm for determining whether inter-RAT measurements can be requested without providing measurement gaps.

FIG. 7 shows initial steps by which a UE's measurement procedure can be configured. The UE 2001 reports, and the network node 2002 receives, the UE's capabilities (e.g., measurement capability for inter-RAT on yARFCN) (step S8-1). The network node checks the reported UE capability information (step S8-2) and tests whether the information indicates that the UE is intra-frequency, inter-RAT capable (decision block S8-3). If not ("No" path out of decision block S8-3), then the network node 2002 will configure the UE 2001 to perform a new measurement during gaps (step S8-7).

However, if the capability information indicates that the UE 2001 can perform intra-frequency, inter-RAT measurements, then the network node determines whether yARFCN overlaps intra-frequency carrier xARFCN (step S8-4), and based on this determination (decision block S8-5) configures a suitable measurement strategy for the UE 2001. In particular, if yARFCN does not overlap xARFCN ("No" path out of decision block S8-5), then the network node 2002 will configure the UE 2001 to perform a new measurement during gaps (step S8-7). However, if yARFCN does overlap xARFCN ("Yes" path out of decision block S8-5), then the network node 2002 will configure the UE 2001 to perform a new measurement without gaps (step S8-6).

FIG. 4 shows interactions between a UE 2001 and a network node 2002 in accordance with some embodiments. After receiving a measurement configuration message from the network node 2002 (401), the UE 2001 configures itself to perform measurements on two cells substantially simultaneously (step S1). Low-pass filtering of the bandwidths (e.g., BW0 and BW1) may be employed as described earlier (step S2). The UE performs signaling (step S3) and reporting (step S4) directed to the network node 2002 in which the UE indicates its capability such as whether it can perform measurements with gaps or without gaps.

The network node processes this information (step S8), including configuring measurement parameters.

Based on received measurement configuration information, the UE 2001 then performs measurements, which performance includes mapping (step S5a) both a first channel number contained in the measurement configuration message and a second channel number for the serving carrier to a physical frequency; comparing (step S5b) the first and second channel number; and determining (step S5c) based on the comparing, a degree of similarity between the first and second channel numbers. In other words, channel numbers (CH #) are used to generation frequency information.

The UE 2002 determines (step S6a) whether an inter-frequency carrier overlaps a new inter-RAT carrier; and if the determining is affirmative, the UE 2001 performs the measurement simultaneously (step S6b).

Step S7a depicts the UE autonomously detecting one or more cells of different RATs having an overlapping frequency range and then, in step S7b, reporting this information.

FIG. 4A also depicts aspects of interactions between a UE 2001 and a network node 2002. The UE transmits, and the network node receives, the UE's capability information (step S3). The network node 2002 configures measurement parameters based on the reported UE capability (e.g., measurement with gap or measurement without gap) (step S8) The network node 2002 transmits, and the UE 2001 receives, the measurement configuration (step S0). The UE then performs steps S5, S6, and S7 (see, e.g., FIG. 4) to achieve performing measurements either with or without gaps based on the received measurement configuration.

FIG. 6 shows a flow chart of a UE algorithm for determining whether inter-RAT measurements can be carried out with single receiver chain without gaps. A new measurement configuration (inter-RAT on yARFCN) is considered (step S0). The UE 2001 decides whether it is capable of measuring in parallel (decision block S0-1). If not ("No" path out of decision block S0-1) then it is assumed that new measurements are to be done using gaps (step S1-2).

Otherwise ("Yes" path out of decision block S0-1), for each carrier in the measurement configuration the UE 2001 determines whether it overlaps the intra-frequency carrier xARFCN (S0-2). If not ("No" path out of decision block S0-3), then it is assumed that measurements are to be done using gaps (step S1-2).

Otherwise ("Yes" path out of decision block S0-3), it is assumed that new measurements are to be done without gaps (step S1-1).

In still other aspects of various embodiments, signaling from the UE 2001 to the network node 2002 comprises signaling that the UE's capability for performing measurements on, for example, first and second cells is intra-frequency inter-RAT provided that a tolerance between center frequencies of the first and second cells is not worse than a threshold.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

Finally, the present disclosure uses the following abbreviations:
ANR Automatic Neighbor Relation
CDMA2000 1×RTT CDMA2000 1× Radio Transmission Technology
CPICH Common Pilot CHannel
HRPD CDMA2000 High Rate Packet Data E-UTRAN Evolution UMTS Terrestrial Radio Access Network
OFDM Orthogonal Frequency Division Modulation
OFDMA Orthogonal Frequency Division Multiple Access
WCDMA Wideband Code Division Multiple Access
BTS Base Transceiver Station
CA Carrier Aggregation
CGI Cell Global ID
ECGI Evolved CGI
PCI Physical Cell ID
3GPP 3rd Generation Partnership Project
BS Base Station
eNodeB evolved Node B
E-SMLC Evolved SMLC
LTE Long-Term Evolution
MDT Minimization of Drive Test
RRC Radio Resource Control
SMLC Serving Mobile Location Center
UE User Equipment
UMTS Universal Mobile Telecommunications System
PCC Primary Component Carrier
PCell Primary Cell (on PCC)
RAT Radio Access Technology
RSRP Reference Symbol Received Power
RSRQ Reference Symbol Received Quality
RSSI Received Signal Strength Indicator
SCC Secondary Component Carrier
SCell Secondary Cell (on SCC)
RN Relay Node
RNC Radio Network Controller
BSC Base Station Controller
HSPA High Speed Packet Access
HRPD High Rate Packet Data
MME Mobility Management Entity
SON Self Organizing Network
OSS Operational Support Systems
O&M Operation and Maintenance
MSR Multi-Standard Radio
LPP LTE Positioning Protocol
LPPa LTE Positioning Protocol annex
EARFCN Evolved Absolute Radio Frequency Channel Number
UARFCN UMTS Absolute Radio Frequency Channel Number
SIB System Information Block
MIB Master Information Block
CoMP Coordinated Multiple Point Transmission and Reception

The invention claimed is:

1. A method of performing at least one measurement on at least a first cell and a second cell, the first cell employing i) a first Radio Access Technology (RAT), different from a second RAT of the second cell, and ii) a first carrier, the method being performed in a User Equipment (UE) and comprising the steps of:
   determining whether or not the first carrier is substantially the same as a second carrier of the second cell;
   in response to the determining step determining that the first carrier is substantially the same as the second carrier, configuring the UE to perform the at least one measurement on the first and second cells simultaneously without measurement gaps; and
   in response to the determining step determining that the first carrier is not substantially the same as the second carrier, configuring the UE to perform the at least one measurement on the first and second cells using measurement gaps,
   wherein the first carrier being substantially the same as the second carrier involves the first and second carriers having substantially the same center frequency, and
   wherein substantially the same center frequency involves a tolerance between the two center frequencies within a range of parts per billion.

2. The method of claim 1, wherein the first RAT is selected from a technology group consisting of Wideband Code Division Multiple Access (WCDMA), Long Term Evolution (LTE), Time Division Synchronous Code Division Multiple Access (TD-SCDMA), High Speed Packet Access (HSPA), Universal Mobile Telecommunications System (UMTS) Terrestrial Radio Access Network (UTRAN), Evolution UTRAN (E-UTRAN), Enhanced Data Rates for GSM Evolution (EDGE), GSM EDGE Radio Access Network (GERAN), Code Division Multiple Access 2000 (CDMA2000), High Rate Packet Data (HRPD) and Worldwide Interoperability for Microwave Access (WiMAX), the second RAT is selected from the technology group, and the second RAT is not the same technology as the first RAT.

3. The method of claim 1, wherein the first and second carriers coincide, at least in a center frequency, with a serving carrier of the UE.

4. The method of claim 3, further comprising:
   low-pass filtering a received data stream over a first bandwidth and a second bandwidth so as to differentiate the serving carrier from the first and second carriers to be measured, when a bandwidth of the first carrier is different from a bandwidth of the second carrier.

5. The method of claim 3, further comprising:
   low-pass filtering a received data stream over a first bandwidth and a second bandwidth so as to perform signal-shaping on the serving carrier as well as the first and second carriers to be measured, when a bandwidth of the first carrier is the same as a bandwidth of the second carrier.

6. The method of claim 3, further comprising:
   signaling, from the UE to a network node, the UE's capability for performing measurements on the first and second cells, wherein the first and second cells are intra-frequency inter-RAT neighboring cells.

7. The method of claim 6, further comprising:
   signaling, from the UE to a network node, the UE's capability for performing measurements on the first and second cells without measurement gaps, wherein the first and second cells are intra-frequency inter-RAT neighboring cells.

8. The method of claim 6, wherein the signaling from the UE to the network node comprises signaling the UE's capability for performing measurements on the first and second cells provided that a tolerance between center frequencies of the first and second cells is not worse than a threshold, wherein the first and second cells are intra-frequency inter-RAT cells.

9. The method of claim 8, wherein the UE is in a position to receive signals from a plurality of cells and a corresponding plurality of RATs, and the signaling from the UE to the network node comprises reporting at least one of:
   an ability to perform intra-frequency inter-RAT measurements on all supported RATs,
   an ability to perform intra-frequency inter-RAT measurements on a specific combination of RATs,
   an ability to perform intra-frequency inter-RAT measurements on all RATs or a subset of RATs having the same carrier as the serving carrier, an ability to perform intra-frequency inter-RAT measurements on all RATs or a subset of RATs having substantially the same center frequency,
an ability to perform intra-frequency inter-RAT measurements per frequency band, and
an ability to perform intra-frequency inter-RAT measurements depending on a bandwidth of the serving carrier.

10. The method of claim 9, wherein the signaling from the UE to the network node further comprises reporting at least one of:
types of intra-frequency inter-RAT measurements,
when the UE is multi-carrier capable, a number or an entirety of carriers that support intra-frequency inter-RAT measurements,
an ability to perform intra-frequency inter-RAT measurements on carriers having a certain tolerance with respect to the serving carrier, and
an ability to acquire system information of a cell using autonomous gaps.

11. The method of claim 8, wherein signaling the UE's capability for performing measurements on the first and second cells is performed proactively.

12. The method of claim 8, wherein the signaling from the UE to the network node is performed responsive to receiving a request from the network node.

13. The method of claim 3, further comprising:
receiving a measurement configuration message from a network node, the measurement configuration message including one or more inter-RAT carriers on which the UE is requested to perform a measurement.

14. The method of claim 13, wherein the measurement configuration message comprises at least one of:
information related to a relative frequency error or frequency error between a set of one or more intra-frequency inter-RAT carriers,
an indication or information regarding a set of RATs whose carriers are aligned, and
an indication to perform the measurement in at least one of a low activity state and in a connected state of the UE.

15. The method of claim 13, wherein determining whether the first carrier is substantially the same as the second carrier of the second cell comprises:
mapping both a first channel number contained in the measurement configuration message and a second channel number for the serving carrier to a physical frequency,
comparing the first and second channel numbers, and
determining based on the comparing, a degree of similarity between the first and second channel numbers.

16. The method of claim 1, wherein the first and second carriers are different, at least in a center frequency, from a serving carrier of the UE.

17. The method of claim 16, further comprising:
signaling, from the UE to a network node, the UE's capability for performing measurements on the first and second cells, wherein the first and second cells are inter-frequency inter-RAT neighboring cells.

18. The method of claim 17, wherein the UE is in a position to receive signals from a plurality of cells and a corresponding plurality of RATs, and the signaling comprises signaling a report, wherein the report comprises at least one of:
a number of carriers which the UE is capable of supporting for monitoring those carriers in parallel, and
when the UE has indicated that the UE is capable of performing intra-frequency inter-RAT measurements, an ability to perform inter-frequency inter-RAT measurements.

19. The method of claim 18, wherein the signaling of the report is performed proactively.

20. The method of claim 18, wherein the signaling of the report is performed responsive to receiving a request.

21. The method of claim 17, wherein the signaling is performed during at least one of:
an initial setup,
a cell setup, and
a cell change.

22. The method of claim 1, further comprising:
signaling, from the UE to a network node, the UE's capability for performing measurements on the first and second cells, wherein the first and second cells are inter-frequency inter-RAT neighboring cells, and
wherein:
the first and second carriers coincide, at least in a center frequency, with a serving carrier of the UE; and
the method further comprises:
receiving a measurement configuration message from a network node, the measurement configuration message including one or more inter-RAT carriers on which the UE is requested to perform a measurement;
determining whether or not an inter-frequency carrier overlaps an inter-RAT carrier of the one or more inter-RAT carriers, and
when the determining determines that the inter-frequency carrier overlaps the inter-RAT carrier, performing the measurement of the inter-RAT carrier and a measurement of the inter-frequency carrier simultaneously.

23. The method of claim 1, further comprising:
autonomously detecting one or more cells of different RATs having an overlapping frequency range.

24. The method of claim 23, further comprising:
reporting, from the UE to a network node, a result of the autonomous detecting.

25. A user equipment (UE) for performing at least one measurement on at least a first cell and a second cell, the first cell employing i) a first Radio Access Technology (RAT) different from a second RAT of the second cell, and ii) a first carrier, the UE comprising:
detector circuitry that detects whether or not the first carrier is the same as a second carrier of the second cell;
configurator circuitry configured to configure the UE to perform the at least one measurement on the first and second cells by:
in response to the detector circuitry detecting that the first carrier is substantially the same as the second carrier, configuring the UE to perform the at least one measurement on the first and second cells simultaneously without measurement gaps; and
in response to the detector circuitry detecting that the first carrier is not substantially the same as the second carrier, configuring the UE to perform the at least one measurement on the first and second cells using measurement gaps,
wherein the first carrier being substantially the same as the second carrier involves the first and second carriers having substantially the same center frequency, and wherein substantially the same center frequency involves a tolerance between the two center frequencies within a range of parts per billion.

* * * * *